(12) United States Patent
Naruse et al.

(10) Patent No.: US 11,423,005 B2
(45) Date of Patent: Aug. 23, 2022

(54) MAP DATA GENERATOR AND METHOD FOR GENERATING MAP DATA

(71) Applicant: Mitsubishi Electric Corporation, Tokyo (JP)

(72) Inventors: Mami Naruse, Tokyo (JP); Kiyotaka Watanabe, Tokyo (JP); Ryosuke Kawanishi, Tokyo (JP); Marina Kousaka, Tokyo (JP); Makito Seki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 426 days.

(21) Appl. No.: 16/482,253

(22) PCT Filed: Nov. 27, 2017

(86) PCT No.: PCT/JP2017/042402
§ 371 (c)(1),
(2) Date: Jul. 31, 2019

(87) PCT Pub. No.: WO2018/185972
PCT Pub. Date: Oct. 11, 2018

(65) Prior Publication Data
US 2020/0226119 A1 Jul. 16, 2020

(30) Foreign Application Priority Data
Apr. 3, 2017 (JP) .............................. JP2017-073600

(51) Int. Cl.
*G06F 16/00* (2019.01)
*G06F 16/23* (2019.01)
(Continued)

(52) U.S. Cl.
CPC ......... *G06F 16/2358* (2019.01); *G01C 21/32* (2013.01); *G06F 16/22* (2019.01); *G06F 16/29* (2019.01)

(58) Field of Classification Search
CPC .......... G01C 21/32; G01C 3/06; G06F 16/22; G06F 16/2358; G06F 16/29; G06F 3/011;
(Continued)

(56) References Cited

U.S. PATENT DOCUMENTS

2009/0228194 A1* 9/2009 Imasaka ................. G01C 21/32
707/999.2
2016/0282127 A1* 9/2016 Goto ...................... G01C 21/30

FOREIGN PATENT DOCUMENTS

JP 2009-193240 A 8/2009
WO 2012/106069 A2 8/2012

OTHER PUBLICATIONS

International Search Report and Written Opinion dated Jan. 30, 2018 for PCT/JP2017/042402 filed on Nov. 27, 2017, 9 pages including English Translation of the International Search Report.

* cited by examiner

*Primary Examiner* — Dinku W Gebresenbet
(74) *Attorney, Agent, or Firm* — Xsensus LLP

(57) ABSTRACT

Provided is an edit unit that checks, as time data, a designated time received in an input unit, against a map data DB to identify map data corresponding to the designated time. Upon the receipt of the designated time in the input unit, a map-data generating unit redoes the update of the map data, identified by the edit unit, using measurement data newly acquired after the designated time is received in the input unit.

18 Claims, 21 Drawing Sheets

(51) Int. Cl.
*G06F 16/22* (2019.01)
*G06F 16/29* (2019.01)
*G01C 21/32* (2006.01)

(58) Field of Classification Search
CPC ............. G06F 3/04815; G06F 3/04847; G06F 3/04883; G06T 17/00; G06T 2210/61; G06T 7/55
See application file for complete search history.

MAP DATA GENERATOR AND METHOD FOR GENERATING MAP DATA

CROSS-REFERENCE TO RELATED APPLICATIONS

The present application is based on PCT filing PCT/JP2017/042402, filed Nov. 27, 2017, which claims priority to JP 2017-073600, filed Apr. 3, 2017, the entire contents of each are incorporated herein by reference.

TECHNICAL FIELD

The present invention relates to a technique of generating three-dimensional map data.

BACKGROUND ART

A common way to generate three-dimensional map data using two-dimensional image data is combining measurement data pieces together, each of which consists of image data pieces imaged from different positions and having a partial overlap between their imaging ranges, and of a distance data piece indicating the distance to an object in each image data piece. Patent Document 1, for instance, discloses a technique of generating a map data piece by obtaining a measurement data piece from a two-dimensional camera and a depth camera, and repeating a mapping process of relating an already-existing map data piece with a new measurement data piece.

For generating broad map data by successively updating the map data with the newly acquired measurement data, as described above, there is sometimes a failure in proper updating of the map data in the midstream of mapping update. Such a failure in proper map data update is found, for instance, when a person suddenly crosses a space under measurement, or when a measuring sensor, which acquires the measurement data, no longer moves to a suitable place, or no longer moves at a suitable speed. If the linking of information pieces about the new measurement data goes on afterwards to update the map, without the map data being properly updated, it is common that errors accumulates, thus degrading the accuracy of a completed version of the map data.

PRIOR ART DOCUMENT

Patent Document

Patent Document 1: International Publication No. 2012-106069

SUMMARY

Problem to be Solved by the Invention

A conventional method for generating map data, as recited in Patent Document 1 and other documents, requires redoing of the map data generation from the beginning if the update has not been performed properly during the map data generation, it is an object of the present invention to efficiently generate map data by redoing the generation of the map data not from the beginning, but from some midpoint, if an error occurs during the map data generation.

Means to Solve the Problem

A map data generator according to the present invention includes the following: a measurement-data acquiring unit 18 that acquires, as a measurement data piece, a plurality of image data pieces in two dimensions and a distance data piece, the image data pieces being continuously imaged, and each having an imaging range partly overlapping an imaging range of at least one of the other image data pieces, the distance data piece indicating the distance to an object within each image data piece; a measurement data database that relates the acquired measurement data piece with a time data piece to store the acquired measurement data piece and the time data piece, the time data piece being used for linking the measurement data piece in chronological order to store the measurement data piece in a database; a map-data generating unit that updates a map data piece in three dimensions generated based on a plurality of the measurement data pieces, every time the measurement data piece is acquired; a map data database that relates the map data piece that is sequentially updated with the time data piece corresponding to the measurement data piece used when the map data piece is updated, to store the map data piece and the time data piece; an input unit that receives an input of a designated time as desired; and an edit unit that checks, as the time data piece, the designated time, received in the input unit, against the map data database to identify the map data piece corresponding to the designated time. Upon the receipt of the designated time in the input unit, the map-data generating unit redoes the update of the map data piece identified by the edit unit, using the measurement data piece newly acquired after the designated time is received in the input unit.

Effects of the Invention

The present invention achieves efficient generation of three-dimensional map data.

DESCRIPTION OF EMBODIMENT(S)

The embodiments of the present invention will be described with reference to the drawings.

First Embodiment

Figure 1:
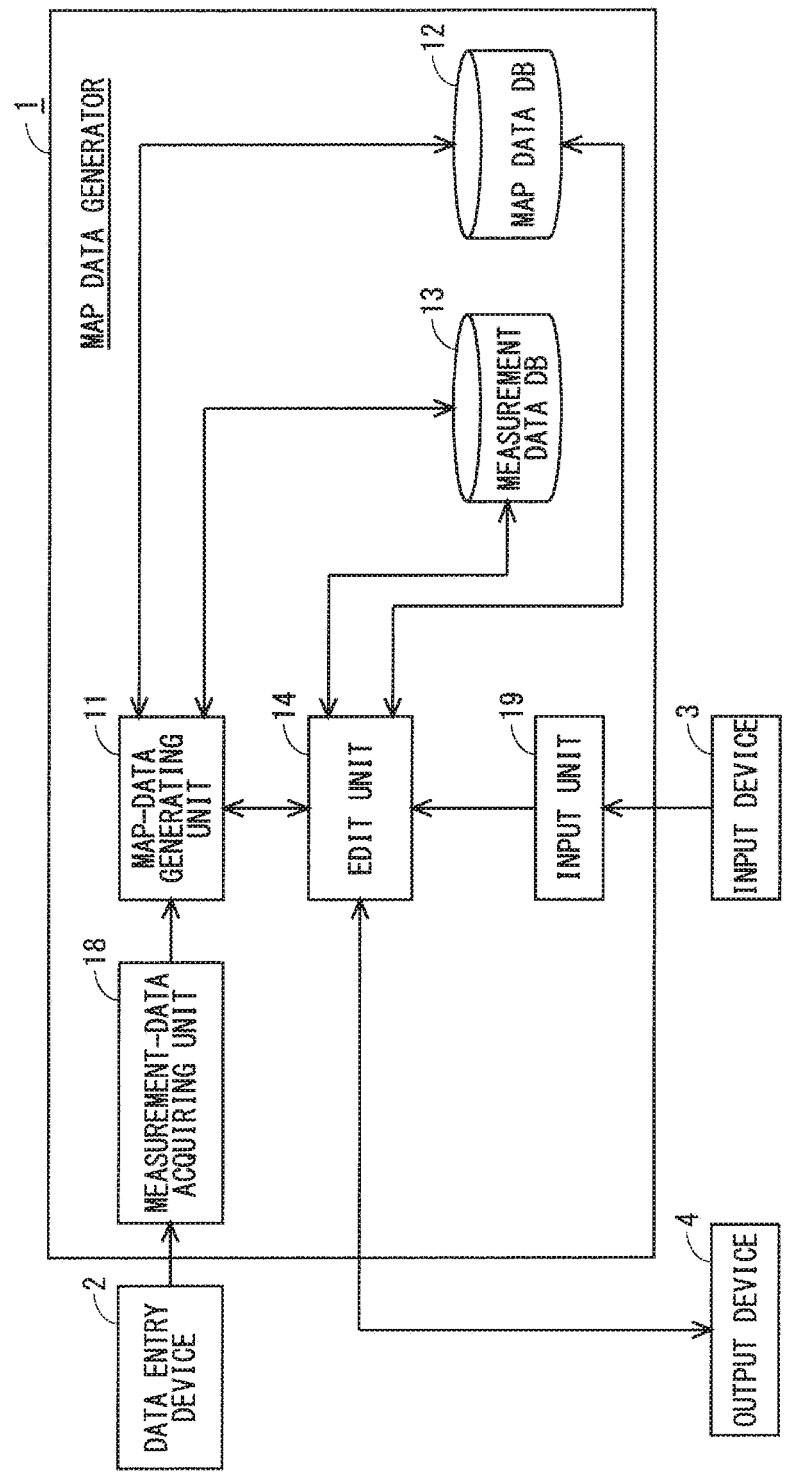
FIG. 1 is a block diagram illustrating a map data generator according to a first embodiment of the present invention.

FIG. 1 is a block diagram illustrating the configuration including a map data generator 1 according to a first embodiment of the present invention. The configuration in FIG. 1 includes the map data generator 1, a data entry device 2, an input device 3, and an output device 4.

The data entry device 2 acquires measurement data about a measurement object for generating three-dimensional map data, and acquires target-position data. A target position herein is a position where each piece of measurement data is acquired. The data entry device 2 sends the measurement data to the measurement-data acquiring unit 18. Here, the measurement data consists of a plurality of data pieces, such as image data pieces, and distance data pieces each of which indicates the distance to an object within the image data piece corresponding to each image data piece. The image data pieces are each a two-dimensional image data piece, such as an RGB image exhibiting an object as imaged for generating the three-dimensional map data. These image data pieces are continuously imaged. The imaging range of the image data piece partly overlaps the imaging range of at least one of the other image data pieces. The distance data pieces corresponding to the image data pieces are continuously acquired. Each individual piece of continuously acquired measurement data is called a frame.

The distance data is acquired through one of various methods, such as a time-of-flight (ToF) method, and an active stereo method using a pattern of light projected from a system that includes a projector and a camera. An example of the target-position data is data corresponding to the six degrees of freedom in translation and rotation. GPS data may be used as the target-position data.

The data entry device 2 may be in any form. For instance, the data entry device 2 may be a device that acquires the measurement data and the target-position data while a user is walking around along with a measuring instrument by hand. Alternatively, the data entry device 2 may be a device that acquires the measurement data and the target-position data while the user is moving a cart or other types of vehicle on which a measuring instrument is mounted. The target-position data may be target-position estimated data that is internally generated when a map-data generating unit 11 generates the map data.

The input device 3 may be in any form. The input device 3 may be a keyboard or a mouse. Alternatively, the input device 3 may be a device (e.g., touch panel) that receives an input in response to a touch of the screen. A mouse, when serving as the input device, is used to perform an input operation via a display screen, which will be described later on. An example of the output device is a display, which displays, for instance, map data to be generated or measurement data under creation. The output device may be any device capable of screen display.

Figure 2:
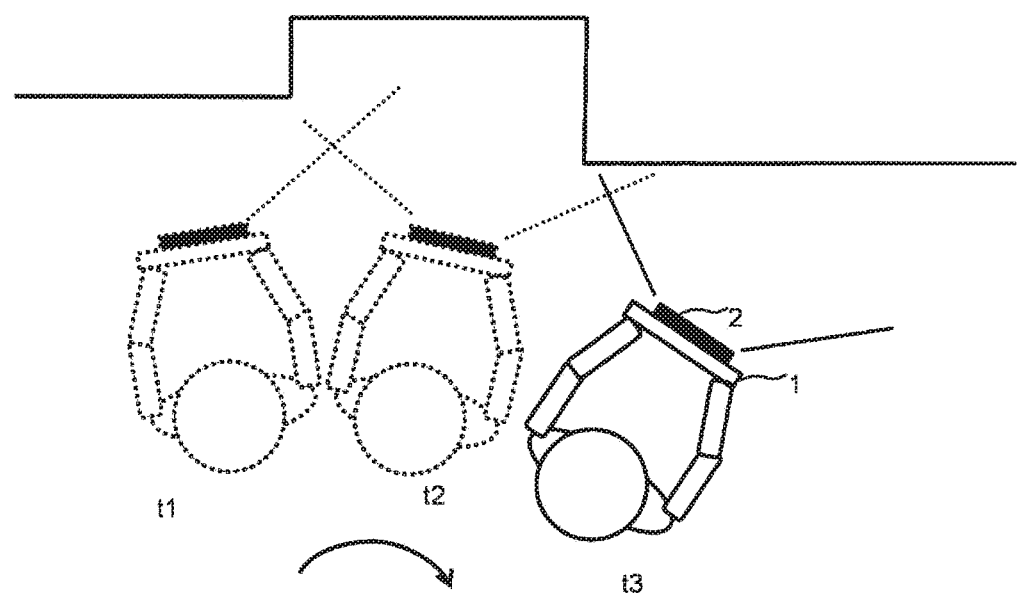
FIG. 2 is a plan view illustrating that a user is generating three-dimensional map data by scanning measurement objects using the map data generator according to the first embodiment.

FIG. 2 is a plan view illustrating that the user is generating spatial map data by scanning the measurement objects using the map data generator according to the first embodiment. A tablet PC can be used as the map data generator 1 to which the data entry device 2 is secured. As illustrated in FIG. 2, the user can move and make a turn while holding the map data generator by hand.

That is, the position and direction of the map data generator can be expressed by the six degrees of freedom in translation and rotation. FIG. 2 shows the user's position from a time t1 to a time t2, and the user's position from the time t2 to a time t3. In this way, the user moves from the times t1 to t3. The user acquires the measurement data at the individual times from the data entry device 2 in such a manner there is a partially overlapping region between the measurement data at each time and the measurement data at the preceding time.

The map data generator 1 includes the map-data generating unit 11, a map data DB 12, a measurement data DB 13, an edit unit 14, measurement-data acquiring unit 18, and an input unit 19. The measurement-data acquiring unit 18 acquires the measurement data and target-position data, acquired in the data entry device 2, and then sends these data pieces to the map-data generating unit 11. The input unit 19 acquires a signal from the input device, and then sends the signal to the edit unit 14. The measurement data DB 13 relates the acquired measurement data with a time, and then stores the measurement data and the time. Here, the map data DB 12 is referred to as a map data database, and the measurement data DB 13 is referred to as a measurement data database.

The map-data generating unit 11 extracts a feature of the measurement object from the acquired measurement data, followed by performing a mapping process using the extracted feature to thus generate and update the map data. The map data DB 12 relates the generate and updated map data with a time corresponding to the measurement data used when the map data is generated and updated, to thus store the related map data. Hereinafter, a time for relating the map data and storing it in the database in chronological order is referred to as time data.

The edit unit 14 performs edits, such as the stop and restart of the generation and update of the map data, in response to a control signal from the input device 3. The details will be described later on. Here, the time data is information for relating the measurement data with the map data, and for identifying which map data has been updated using which measurement data. Examples of the time data include, but not limited to, a time at which the measurement data is acquired, a time at which the map data is updated, a time at which the image data is imaged, and any time at which the measurement data is related with the map data generated based on the measurement data. The time data and the measurement data are related with each other, and are then stored in the measurement data database. That is, the image data, the distance data, and the time data are related with each other, and are then stored. The input unit 19 acquires the input from the input device 3.

Figure 3:
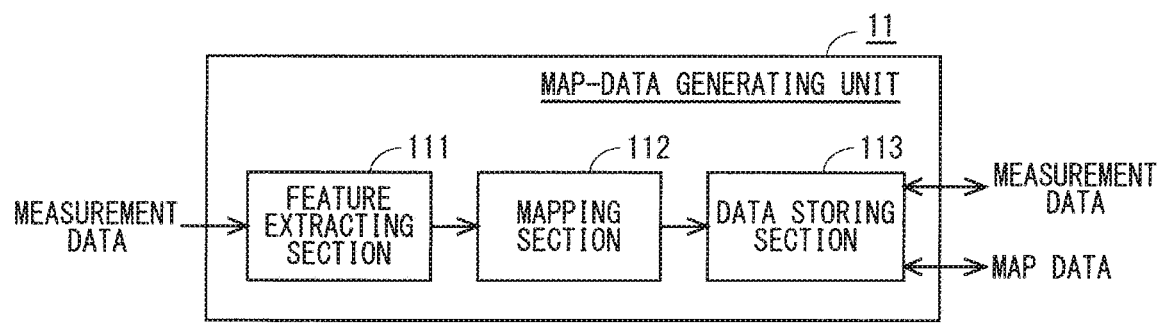
FIG. 3 is a block diagram illustrating the process in a map-data generating unit according to the first embodiment of the present invention.

FIG. 3 is a block diagram detailing the process in the map-data generating unit 11. The map-data generating unit 11 further includes a feature extracting section, a mapping section 112, and a data storing section 113. The feature extracting section 111 extra s features from the image data. Examples of the features include shape-related features and primitives. Examples of the shape-related feature include straight lines (e.g., ridge lines), points (e.g., vertexes), the direction of a straight line, and a normal line of a plane.

Examples of the primitives include a circle, a quadrangle, and a sphere. There are various methods of extracting the features, as follows: For extracting a vertex, curvature calculation can be used for instance. For extracting a ridge line. Hough transformation can be used for instance. For extracting a primitive, model fitting by the use of a three-dimensional model can be used for instance. In this way, the shape-related features and the primitives can be extracted through common methods.

The mapping section 112, which performs mapping, aligns the measurement data pieces whose imaging positions are different from each other and whose imaging ranges partly overlap each other, by the use of the extracted features, followed by combining these measurement data pieces together, thus generating and updating the map data. Firstly, the mapping section 112 combines the measurement data pieces together whose imaging positions are different from each other and whose imaging regions partly overlap each other, thus generating the map data.

The mapping section 112 then combines the acquired measurement data piece with the immediately preceding measurement data piece, thus updating the generated map data. The mapping section 112 updates the map data sequentially in this way. Such sequential update broadens the range of the map data, thereby generating the map data extending over a wide range of space. The mapping section combines at least two pieces of measurement data as described above, and relates their features with each other over three-dimensional space.

Here, the wording, "using the extracted feature" means finding a common feature from the two pieces of measurement data. The map-data generating unit 11 then performs coordinate transformation in such a manner that the features of the measurement data pieces coincide with each other over the three-dimensional space. For instance, the map-data generating unit 11 transforms the coordinates of the measurement data piece after movement, with reference to measurement data piece that is immediately anterior to the measurement data piece in the newly obtained frame, in such a manner that the feature in the measurement data after movement coincides with the measurement data piece before movement.

At this stage, obtained is a relationship in the position and posture (i.e., target-position data) of the data entry device 2 after movement with respect to the position and posture thereof before movement. The target-position data can be obtained by calculating a transform matrix using at least one of features, such as a point, a line, and a plane. The measurement data used for mapping can be obtained from the measurement data DB 13.

The data storing section 113 newly stores the measurement data acquired from the data entry device 2, and the generated map data, in the measurement data DB 13 and the map data DB 12, with the same time data being assigned to these data pieces (i.e., the acquired measurement data and the generated map data are brought into sync with each other). The time data is related with the measurement data and the map data in chronological order, and is then stored; a time at which the measurement data may be stored for relation; alternatively, a time at which the image data is imaged may be stored for relation.

The map-data generating unit 11 stops, restarts, and ends the map data generation in response to the control signal about the map data generation, which is input from the edit unit 14. The details will be described with reference to a flowchart that follows. In addition, the map-data generating unit 11 outputs the latest map data and the latest measurement data to the output device 4, every time the map-data generating unit 11 performs the map data. The measurement data may be displayed, or both of the measurement data and the map data may be displayed; any of them may be displayed.

The map data DB 12 is a database that stores, together with the time data, the map data generated and updated in the past, including the latest map data. The measurement data DB 13 is a database that stores the measurement data acquired by the data entry device 2, together with the time data.

The input device 3 and the output device 4 will be described, followed by the edit unit 14. The input device 3 inputs control data relating to the map data generation, including the start and stop of the map data generation, the designation of a time for redoing the generation from some midpoint, the restart and end of the map data generation. An example of how to input the control data is inputting a command or a character string via an input interface, such as a character user interface (CUI). Instead of a CUI, a graphical user interface (GUI) may be used for inputting the control data. How to input the control data through a GUI will be described later on. The input unit 19 receives the control data as input by the input device 3.

Here, a time that is input at which the user wants to redo the map data generation is referred to as a designated time. In some cases, the map data is updated at a designated time as received through a mechanism, which will be described later on. In these cases, the map data generation may be redone, after the designated time is received, and further, after a button restart button) is pressed. That is, upon receipt of a request for map data update, the map data generation may be redone. Alternatively, the receipt of the designated time may trigger the redoing of the map data generation. Here, redoing the map data generation means redoing the map data update from some midpoint. The map data undergoes updates to be completed. When the user wants to redo the generation of the map data from some midpoint, the user goes back to the intended midpoint, and then redoes the map data update from this midpoint to complete the map data.

The output device 4 is a terminal that outputs information necessary for the user to enter the control data, relating to the map data generation. For a tablet PC for instance, an example of its display is, but not limited to, a display with a touch panel being integrated can be used as the input device 3 and the output device 4.

The edit unit 14 edits the map data in response to the control signal received from the input device 3. For a control signal indicating the start, stop, or end of the generation, the edit unit 14 sends the control signal to the map-data generating unit 11 to cause the map-data generating unit 11 to start, stop, or end the generation. Upon receiving the designated time, which is a time for a map data redo, the edit unit 14 identifies the corresponding measurement data from the measurement data DB 13, and also identifies the corresponding map data from the map data DB 12, by the use of the designated time as the time data. A rendering unit (not show) outputs the identified map data and the identified measurement data to the output device 4.

These data pieces are output for helping the user go back to a past time point for a redo. At this stage, the rendering unit may display the measurement data, or both of the measurement data and the map data. Reference is made to FIG. 2, in which the time t3 is the current time, and the time t1 is the designated time. In this case, the measurement data at the designated time, i.e., at the time t1, is Output to the Output device 4. Based on the information about the measurement data, the user moves the data entry device 2 so as to be situated in a position and posture close to the position and posture at the time t1.

The map-data generating unit 11 restarts the map data generation, when the map-data generating unit receives a signal indicating the restart of the map data generation, and when there has been no input of the designated time before the time of the receipt. When there has been an input of the designated time, the map-data generating unit 11 establishes, as the latest time, the map data and the measurement data stored in the map data DB 12 and the measurement data DB 13 at this designated time, followed by deleting the subsequent data and restarting the map data generation. The data on or after the designated time may be kept without being used.

Figure 4:
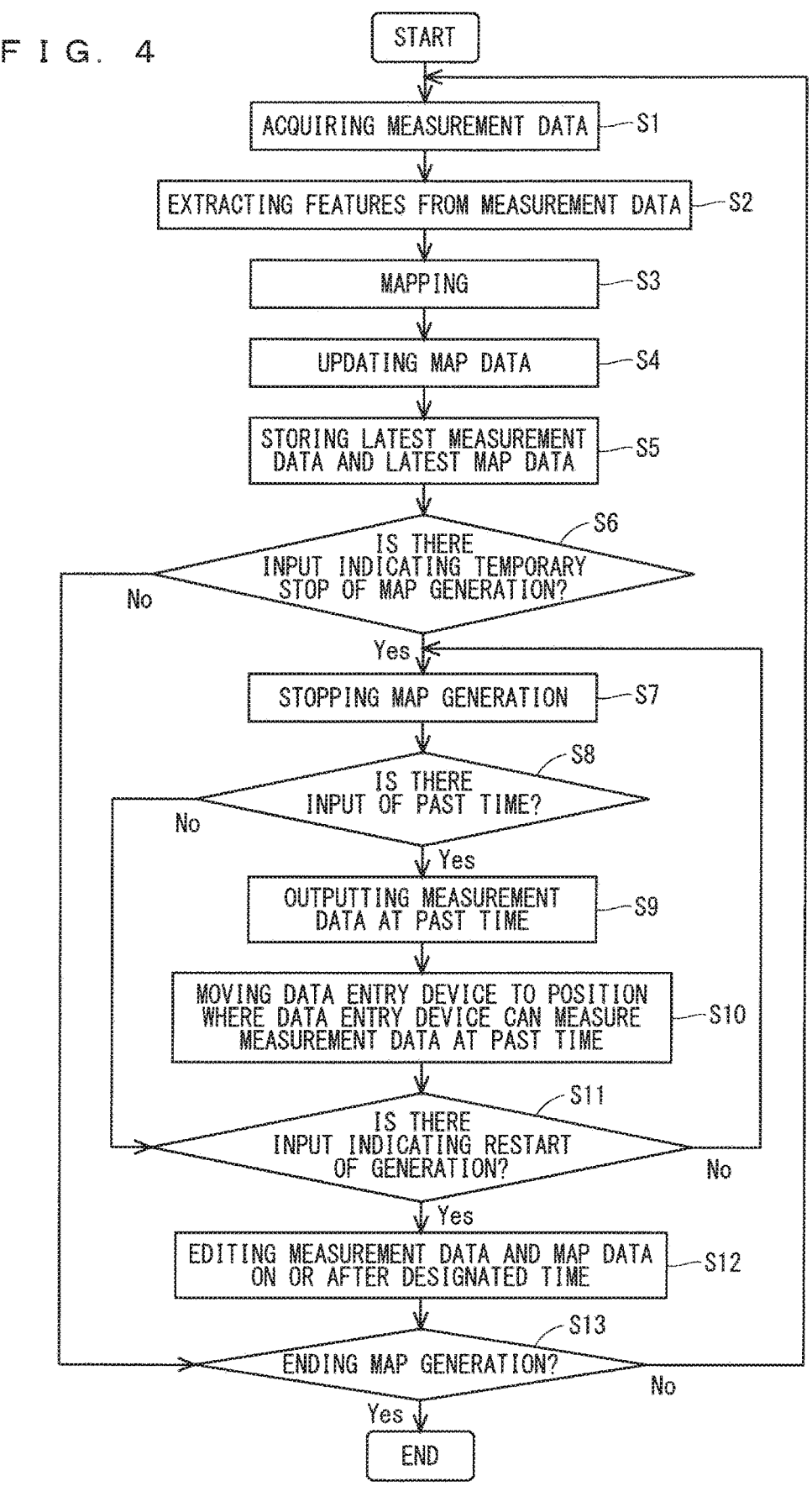
FIG. 4 is a flowchart showing the operation of the map data generator in FIG. 1.

FIG. 4 is a flowchart showing the operation of the map data generator in FIG. 1. The following describes the overall process relating to the map data generator according to the embodiment, with reference to the flowchart in FIG. 4. Upon the start of the process, the measurement-data acquiring unit 18 of the map data generator 1 acquires a measurement data piece from the data entry device 2 (i.e., step S1), and the measurement-data acquiring unit 18 extracts features from the measurement data piece (i.e., step S2). Subsequently performed is mapping, in which the features of the measurement data piece and the features of another contiguous measurement data piece are superimposed (i.e., step S3). Three-dimensional map data is generated and updated through this mapping process. The three-dimensional map data, generated based on the plurality of measurement data pieces, is updated every time the measurement data piece is acquired.

In the mapping process, the map-data generating unit 11 combines the latest measurement data piece acquired from the measurement data DB 13 with the measurement data piece acquired from the data entry device 2, to thus generate or update the map data. The acquisition of the measurement data pieces to be combined together is not limited to the aforementioned example. The measurement data pieces from the measurement data DB 13 may be combined together.

The map-data generating unit 11 then respectively stores the latest measurement data piece and the generated or updated map data in the map data DB 12 and the measurement data DB 13, with the same time data being assigned to these data pieces, and the map-data generating unit 11 displays the latest map data piece onto the output device 4 (i.e., step S5). The map-data generating unit 11 does not necessarily have to display the map data, i.e., the map data piece is not displayed in some cases. Thereafter, the edit unit 14 checks whether it has received an input indicating the stop of the map data generation via the input device 3 (i.e., step S6). For no input indicating the stop of the map data generation, the edit unit 14 checks whether it has been received an input indicating the end of the map data generation (i.e., step S13). If no, the measurement-data acquiring unit 18 acquires a new measurement data piece again step S1); the same process steps are repeated thereafter.

When the input unit 19 has received an input indicating the stop of the map data generation from the input device 3 (i.e., step S6), the edit unit 14 sends a control signal indicating the stop of the map data generation to the map-data generating unit 11; the map-data generating unit 11 stops newly updating the map data after it finishes the generation and update of the map data based on the measurement data in progress, and the map-data generating unit 11 awaits a new input from the input device 3 (i.e., step S7). When the input unit 19 has received an input indicating a time for redoing the map data generation (i.e., designated time) from the input device 3 (i.e., step S8), the rendering unit acquires a corresponding measurement data piece from the measurement data DB 13, using the designated time as input, as time data, and the rendering unit outputs the measurement data piece to the output device 4 (i.e., step S9).

The edit unit 14 repeatedly outputs the measurement data to the output device 4 (i.e., step S9) in response to any input of the designated time (i.e., step S8), until the input unit 19 receives an input indicating the restart of the generation from the input device 3 (i.e., step S11). At this stage, the user who has confirmed the measurement data piece at the designated time that has been output moves, based on the confirmed measurement data piece, the data entry device 2 to a position in which a measurement data piece to be newly acquired next time is presumed to partly overlap the measurement data piece at the designated time (i.e., step S10).

When the input unit 19 has received an input indicating the restart of the generation (i.e., step S11), the map-data generating unit 11 checks, as the time data piece, the designated time against the map data DB 12 and the measurement data DB 13 to identify the corresponding reap data piece and measurement data piece. The map-data generating unit 11 then establishes the identified map data piece and measurement data piece as the latest data pieces in the map data DB 12 and the measurement data DB 13, and then performs editing, such as deleting the map data pieces and measurement data pieces in the map data DB 12 and the measurement data DB 13 on or after the designated time (i.e., step S12).

After that, when the input unit 19 has received no input indicating the end of the map data generation from the input device 3, the process returns to step S1. The map-data generating unit 11 uses the measurement data piece newly acquired after the designated time is received in the input unit 19, to thus redo the generation of the map data identified by the edit unit 14.

The map-data generating unit 11 ends the map data generation when the input unit 19 that has received the designated time receives an input instructing the end of the map data generation from the input device 3 (i.e., step S13). The map data is herein updated in response to an input of the designated time and to an input indicating the restart of the generation, which is a request for map data update. The map data may be updated in response to any input; the map data may be updated in response to an input of the designated time.

When the user checks for an error and other things in the update of the map data while the user is generating the map data, to determine that the map data has not been properly updated, the aforementioned map data generator allows the user to acquire the map data at a past time (i.e., a time before an error occurs) again, to combine the pieces of measurement data from the past time, and to restart the generation of the map data. This eliminates the need for redoing the map data generation from the beginning, or editing the map data after the map data generation, thereby allowing the user to efficiently generate the map data.

It is noted that the map data generator in the first embodiment may start generating the map data after the input device 3 inputs the control single indicating the start of the map data generation, or may start generating the map data soon after the map data generator initiates its system. It is also noted that referring to the mapping in step S3, the process may return to step S1 without going through the subsequent process steps when sufficient features have not been acquired in the feature extraction in step S2 (i.e., when the features do not satisfy a predetermined threshold).

The latest map data (as well as the measurement data) during the map data generation does not have to be output to the output device 4. Instead, the latest map data may be displayed on the output device 4 when the map data generation is stopped. That is, the latest map data does not have to be always output to the output device 4 for feedback to the user, during the map data generation; instead, the latest map data may be displayed for feedback only when the map data generation is temporarily stopped.

The measurement-data acquiring unit 18 may read the measurement data and the target-position data that have been previously acquired, and then may input these data pieces to the map-data generating unit 11. In this case, the measurement data and the target-position data may be stored on, but not limited to, the cloud. The wording that the data entry device 2 is moved after the designated time is input in step S8, so that the measurement data is acquired, is a concept that includes updating of the map data from the different measurement data that is connected to the different measurement data at the designated time as stored.

Figure 5:
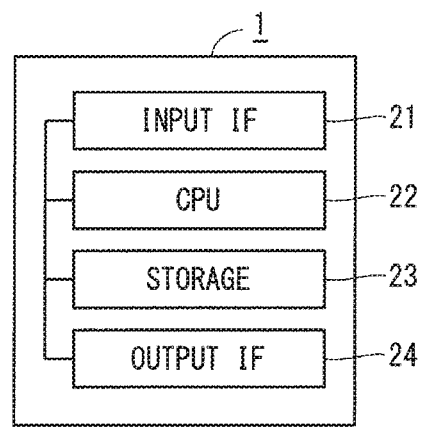
FIG. 5 is a diagram illustrating the hardware configuration of the map data generator.

FIG. 5 is a diagram illustrating the hardware configuration of the map data generator 1. The map data generator includes an input interface 21, a central processing unit (CPU) 22, a storage 23, and an output interface 24. Each interface will be hereinafter abbreviated as an IF. The data in the map data DB 12, the measurement data DB 13, and other things is implemented by the storage 23. The functions of the map-data generating unit 11, the edit unit 14, and other components are implemented by the CPU 22 that executes a program. The measurement-data acquiring unit 18 and the input unit 19 are included in the input IF. The rendering unit is included in the output IF.

Each IF is a wired port (e.g., cable port), an USB port, a direct-connection port, or a wireless-network port. The storage 23 is a storing medium, such as an HDD, an SSD, or a flash memory. The map data generator 1 can be included in a computer, such as a tablet personal computer (PC) or a laptop PC.

Second Embodiment

A second embodiment describes an input method via a graphical user interface (GUI). The second embodiment is different from the first embodiment in that a rendering unit 15 is provided that renders a GUI. The second embodiment is the same as the first embodiment in the rest of the configuration, i.e., the generation and update of the map data.

In the map data generator 1 in the first embodiment, the user designates a designated time in order to redo the map data generation. The map data generator 1 then checks the measurement data and the map data at that time to determine whether these data pieces are suitable for a redo; if the data pieces are unsuitable, the map data generator 1 allows the user to restart the map data generation from that time. Unfortunately, the user needs to repeatedly input designated times until finding a suitable designated time. Such input operation is complicated.

In view of this point, the map data generator in this embodiment uses a GUI to input a control about the map data generation including the input of a designated time, thus facilitating a user's input operation. The following describes the details.

Figure 6:
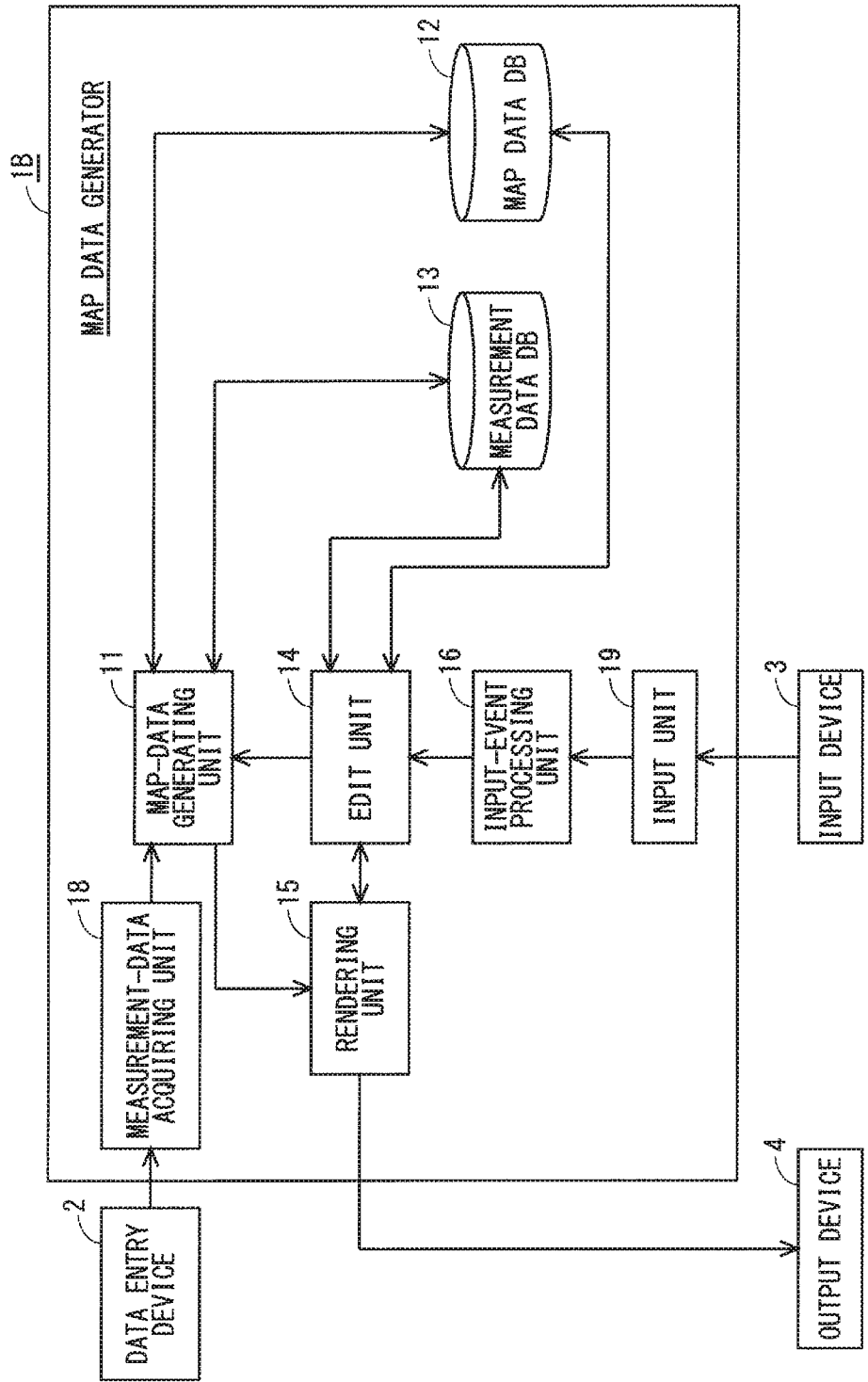
FIG. 6 is a block diagram illustrating a map data generator according to a second embodiment of the present invention.

FIG. 6 is a block diagram illustrating the configuration of a map data generator 1B according to the second embodiment of the present invention. The map data generator 1B includes an input-event processing unit 16 in addition to the configuration of the map data generator 1 (FIG. 1).

The rendering unit 15 graphically renders, as a screen, a situation in which the map data is generated, an input means for editing the map data, and an input means necessary for controlling the map data generation, and the rendering unit 15 outputs them to the output device 4. The rendering unit 15 puts image components constituting the screen onto a logical coordinate system on a computer. Examples of the image elements include image components indicating operational interfaces (e.g., a button and a seek ba the measurement data piece, and the map data piece.

The image components indicating the operational interfaces are stored in the rendering unit 15 in advance. The rendering unit 15 transforms the logical coordinate system into a physical coordinate system through a commonly used coordinate transformation method for an image display system, and then outputs the transformed coordinates to the output device 4, such as a display. The rendering process is performed in accordance with an instruction to update the rendering from the map-data generating unit 11 or the edit unit 14. The details of the rendering will be described later on.

The input-event processing unit 16 distinguishes, as operational events, user's operations from each other that are input from the input device 3 to the image components on the output device 4 via the input unit 19, and sends control signals assigned individually to the edit unit 14. The operational event is distinguished in the following manner: the image component as operated is identified by transforming coordinates on the physical coordinate system that have been input into coordinates on the logical coordinate system; then an operational event in conformance with a detailed operation is determined with a commonly known method. The input unit 16 then sends a control signal corresponding to the operational event to the edit unit 14. In the present embodiment, information about the operational event and the control signal is stored in the computer.

The edit unit 14 in the second embodiment controls the map data generation, which is performed in the map-data generating unit 11, on the basis of the control signal, sent from the input-event processing unit 16, in a manner similar to that in the first embodiment. The edit unit 14 also sends the instruction to update the rendering to the rendering unit 15 in response to some kind of control signal.

The map-data generating unit 11 in the second embodiment sends the latest measurement data and the latest map data to the rendering unit 15 when generating the map data. Further, when the designated time is input, the measurement data and the map data corresponding to the designated time are displayed on the screen. This allows the user to check the measurement data and the measurement data to thus determine a place to redo the update of the map data.

The measurement data herein is image data in the measurement data. The user can check the image data to determine what time and where the user was. The following describes a series of process steps in the map data generator 1B using a screen displayed on the output device 4 as an example. How to generate the map data is similar to that in the first embodiment.

Figure 7:
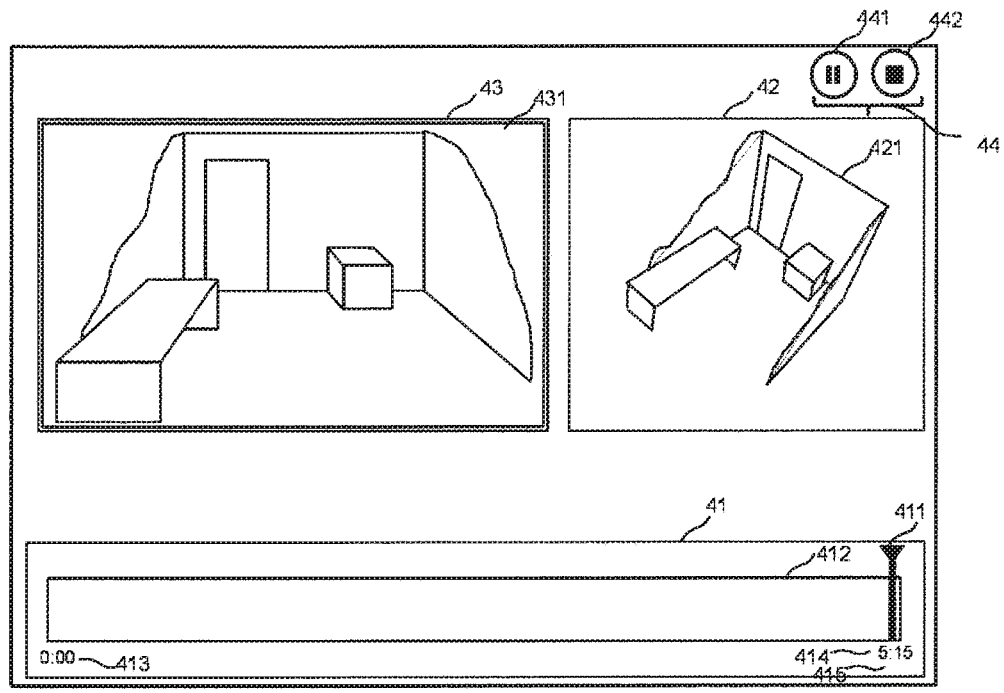
FIG. 7 is a diagram illustrating a display screen during map data generation in the second embodiment of the present invention.

FIG. 7 is a diagram illustrating an example of the screen rendered in the output device 4 during the map data generation. Examples of rendering components include a seek bar 41, a map-data rendering region 42, a measurement-data rendering region 43, and a control button group 44 for controlling the map data generation. The seek bar 41 consists of the following rendering components: a slider 411, a bar 412, a map-data-generation start time 413, a map-data-generation lapse time 414, and a designated time 415. The bar 412 represents the time base of measurement. Time information is indicated under the bar 412.

In this example, the map-data-generation start time 413 is displayed at the left end, the map-data-generation lapse time, which is the total time that has elapsed from the start of the map data generation, is displayed at the right end, and the designated time 415, which is a time indicated by the bar, is displayed at the right end. The map-data-generation start time is set at "0:00". In this example, the breadth of the bar 412 is fixed. Further, the map-data-generation lapse time 414 is updated every predetermined time (e.g., every one second) as long as the map data generation continues. Still further, the length of the bar 412 per unit time varies.

The slider 411 is indicated on the bar 412, and moves from side to side. Nevertheless, during the map data generation, the slider 411 is displayed in fixed state in a position indicating a certain time (e.g., the map-data-generation lapse time 414). The slider 411 may be hidden. The designated time is received and input by, but not limited to, an operation of moving the slider from side to side. The designated time may be directly designated; the designated time may be designated in any manner.

The latest map data 421 in the map data generation is displayed in the map-data rendering region 42. The map data 421 is displayed as viewed from above, from predetermined coordinates on a three-dimensional coordinate system, for instance. The latest measurement data 431 (e.g., RGB image) used for generating the map data 421 is displayed in the measurement-data rendering region 43.

At the timing after the map-data generating unit 11 newly generates the map data piece, the map data, the measurement data, and an instruction to update the rendering of these data pieces are sent from the map-data generating unit 11 to the rendering unit 15; the rendering unit 15 then updates the renderings in the map-data rendering region 42 and the measurement-data rendering region 43.

The rendering unit 15 puts the map data on a three-dimensional logical coordinate system, and generates a viewpoint image from predetermined three-dimensional coordinates. This viewpoint image is the map data 421. In some cases, the rendering of the map data 421 no longer fits in the map-data rendering region 42 as the map data generation progresses. In these cases, the rendering unit 15 renders the map data 421 by, for instance, regulating the scale of the three-dimensional coordinate system to reduce or enlarge the map data 421.

Control buttons indicating the start, stop, restart, and end of the map data generation are displayed as the control button group 44. During the map data generation, a map-data-generation stop button 441 and a map-data-generation end button 442 are displayed, for instance.

Upon user's operation of the map-data-generation stop button 441, the edit unit 14 receives a corresponding control signal from unit 19 through the processing in the input-event processing unit 16, and the edit unit 14 controls the map-data generating unit 11 to temporarily stop the map data generation, and instructs, to the rendering unit 15, a designated screen at the designated time for redoing the map data generation from at a certain time point in the past. The designated screen is thus rendered on the output device 4.

Figure 8:
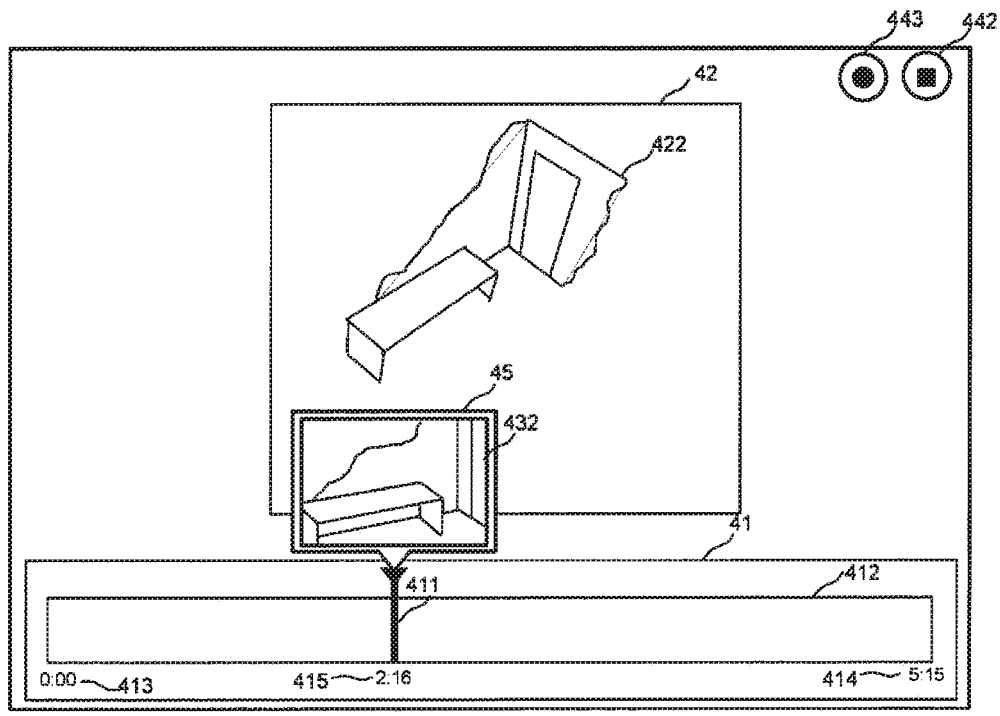
FIG. 8 is a diagram illustrating a display screen at temporary stop of the map data generation according to the second embodiment of the present invention.

FIG. 8 is a diagram illustrating one example of a display screen at the time of the temporary stop of the map data generation (i.e., the designated screen at the designated time). This screen consist of, for instance, the seek bar 41, the map-data rendering region 42, a measurement-data display region 45, and the control button group 44. The slider 411 of the seek bar 41 is movable in parallel, i.e., from side to side, during the stop of the map data generation. The user operates the slider 411 to designate the designated time in the past to which the user wants to go back. The designated time is thus received by the input unit 19. At this stage, measurement data 432 and map data 422, the closest to the designated time, is rendered to be provided to the user. Here, the measurement data mainly is image data.

That is, upon the receipt of the designated time, the edit unit 14 checks, as the time data, the designated time against the measurement data database to identify the image data; the rendering unit 15 displays the image data identified by the edit unit or the map data identified by the edit unit 14. Although the measurement data 432 is rendered in the measurement-data display region 45 disposed on the slider 411, the measurement-data display region 45 may be displayed at the side of the map-data rendering region 42. The measurement-data display region 45 may be displayed in any manner.

The following describes a series of process steps when the slider 411 is operated. Upon detecting a movement of the slider 411 while the generation is being stopped, the input-event processing unit 16 determines the movement as a designated operational event at the designated time, and acquires the amount of the movement of the slider 411, followed by sending the amount of the movement together with a control signal to the edit unit 14. The edit unit 14 instructs the rendering unit 15 to update the rendering of the slider 411.

The rendering unit 15 calculates the rendering position of the slider 411. At the same time, the rendering unit 15 calculates the time after the update from the position of the slider 411, and requests the edit unit 14 to check, as the time data, the designated time against each of the measurement data DB 13 and the map data DB 12 to acquire the measurement data and the map data at the designated time.

The edit unit 14 then identifies the measurement data 432 and the map data 422, the closest to the designated time, from the measurement data DB 13 and the map data DB 12 to send these data pieces to the rendering unit 15. Upon receiving these data pieces, the rendering unit 15 renders the map data 422 and the measurement data 432 as well as the slider 411 after movement. The series of process steps repeats while the operational event of the slider 411 is occurring (i.e., while the slider 411 is moving).

The map-data-generation end button 442 and a map-data-generation restart button 443 are displayed as the control button group. Like the first embodiment, after deciding the designated time to redo the map data generation, the user moves the data entry device 2, and operates the map-data-generation restart button 443; accordingly, the map-data generating unit 11 switches the screen display to a screen under generation, and also updates the rendering of the seek bar 41, followed by connecting together again information pieces about the measurement data from the map data at the designated time on the basis of the designated time as the time data, to thus generate the map data.

Here, the wording that the map-data-generation restart button 443 is operated means receiving a request for map data update. Such a request for map data update may be received in any manner. Upon receipt of a request for map data update in the input unit 19 while the image data or the map data identified at the designated time by the rendering unit 15 is being displayed, the map-data generating unit 11 redoes the map data generation from the time point of the receipt of the request for map data update. The rendering of the seek bar is updated by calculation such that a redo time is positioned at the right end of the bar 412, and by redoing the rendering accordingly.

A series of specific process steps after the operation of the map-data-generation restart button is the same as that described in the first embodiment and that described in the second embodiment. When there is an error found in the map data at some midpoint of the map data generation, the aforementioned map data generator allows the user to move the slider of the seek bar, and to decide the time to redo the map data generation while checking the measurement data and the map data in the past displayed in accordance with the position of the slider (i.e., time). That is, the map data generator facilitates user's input for the map data generation, thereby improving the efficiency of the process for generating the map data.

It is noted that the breadth of the bar 412 the length of the time base) of the seek bar 41 in the second embodiment does not necessarily have to be fixed; the display of the bar 412 may be extended by a predetermined width for each increase in time for the map data generation. In this case, when the bar display does not fit within the region of the seek bar 41, a scroll bar may be separately provided, so that the bar display is scrolled (the latest time may be always displayed during the map data generation).

Reference is made to the map data 421 displayed in the map-data rendering region 42, and the map data 422 in the past. The rendering unit 15 may use the target-position data in the data entry device 2 to generate and render these map data pieces that can be observed from the three-dimensional coordinates and orientation in the data entry device 2, instead of using a method of displaying, in fixed form, these data pieces from a predetermined point of view of three-dimensional coordinates.

In addition, for helping the user designate the designated time, the current measurement data in the data entry device 2 may be acquired and displayed, so that the user can go back to the position at the designated time while comparing the current measurement data with the measurement data at the designated time. The differences between the present embodiment and the first embodiment have been described. The other configuration is similar to that in the first embodiment.

Third Embodiment

The map data generator in the second embodiment provides the user with the measurement data (i.e., image data) and the map data at the designated time, in order to help the user go back to a location in the past when the user designates a time to redo the map data generation (i.e., designated time). With these information items alone, however, the user has difficulty in determining the position and posture of the data entry device 2 at a time point of imaging of the measurement data, and thus requires some time to go back to a suitable position in some cases.

In view of this point, a third embodiment describes, when the user goes back to the time to redo the map data generation, providing the user with the target-position data, which is a movement path of the data entry device 2 and is positional information of the data entry device 2, so that the position and posture at the designated time can be easily visible again to the user, thus allowing the user to restart the map data generation smoothly. The following describes the details.

Figure 9:
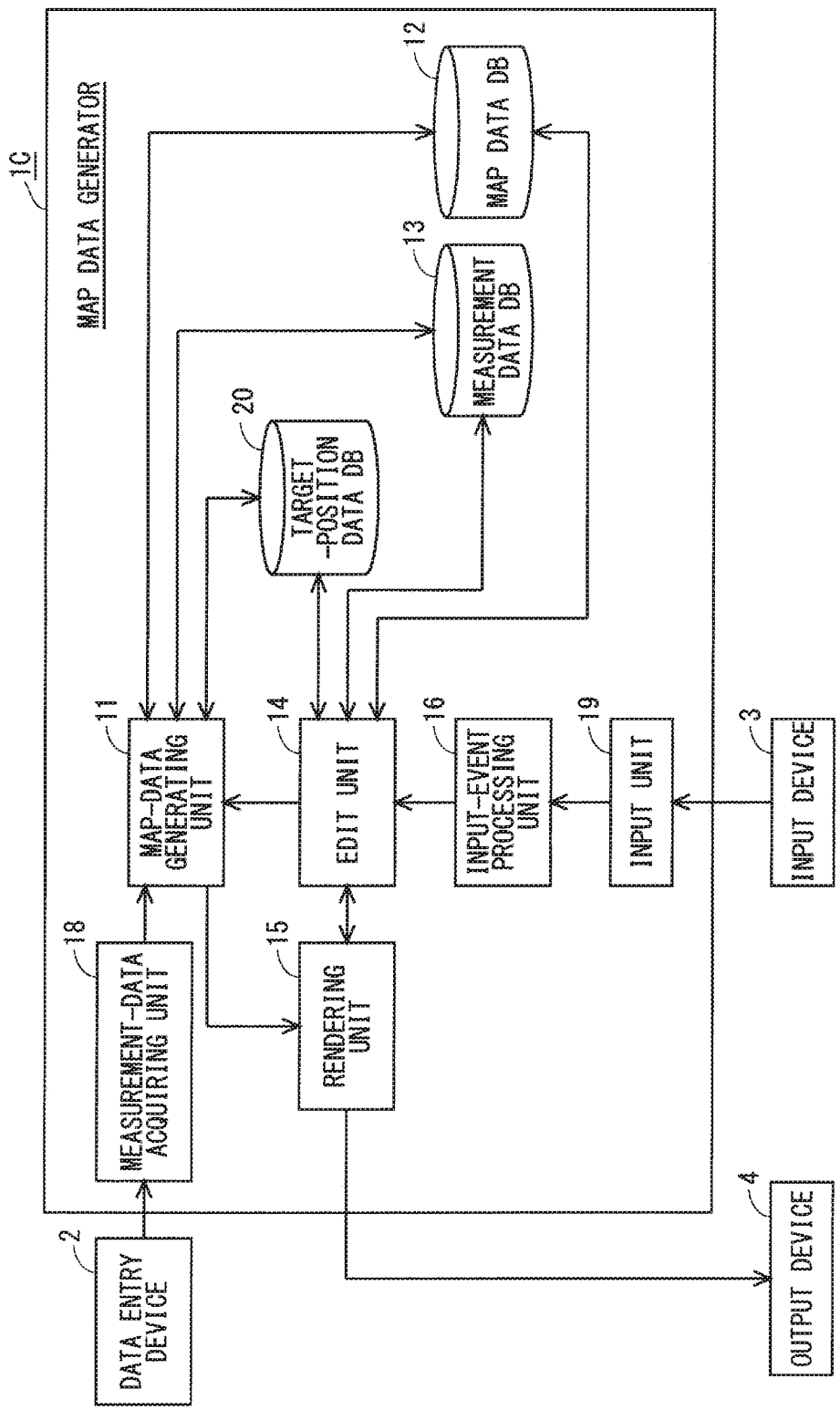
FIG. 9 is a diagram illustrating a map data generator according to a third embodiment of the present invention.

FIG. 9 is a block diagram in the present embodiment. The map data generator 1C includes a target-position data DB 20 in addition to the configuration in the second embodiment. The target-position data DB 20 accumulates the target-position data, which is acquired in each frame, together with the time data. The map data generator in the present embodiment is different from those in the aforementioned embodiments in that the edit unit 14 identifies the target-position data from the designated time as received, and that the rendering unit 15 displays the target-position data onto an output device, such as a screen.

Referring to a method of processing, the flowchart in FIG. 4 additionally includes step S5 of storing the measurement data and the map data after the mapping step, and includes step S9 of outputting the measurement data at the designated time. In step S5, when storing the latest measurement data and the latest map data in the measurement data DB 13 and the map data DB 12, the map-data generating unit 11 accumulates, in the target-position data DB 20, the target-position data acquired at the same time and in the same frame as these data pieces.

The map-data generating unit 11 also stops the map data generation, and in step S9 of outputting the measurement data at the designated time as received, the map-data generating unit 11 renders the position and posture of the data entry device 2 and an imaging range of the data entry device 2 onto the map data. Upon receiving the designated time, the edit unit 14 checks, as the time data, the measurement data, along with the map data and the designated time, against the target-position data DB 20 to acquire the target-position data at the designated time.

The rendering unit 15 is instructed to render the position and posture of the data entry device 2 together with the measurement data and the map data, and the rendering unit 15 receives the target-position data. After rendering the map data, the rendering unit 15 renders the position and posture of the data entry device 2 onto the map data on the basis of the acquired target-position data. Although the map data and the target-position data herein is displayed onto the screen, the target-position data alone or the map data alone may be displayed onto the screen. In addition, the measurement data as well may be displayed onto the screen.

Figure 10:
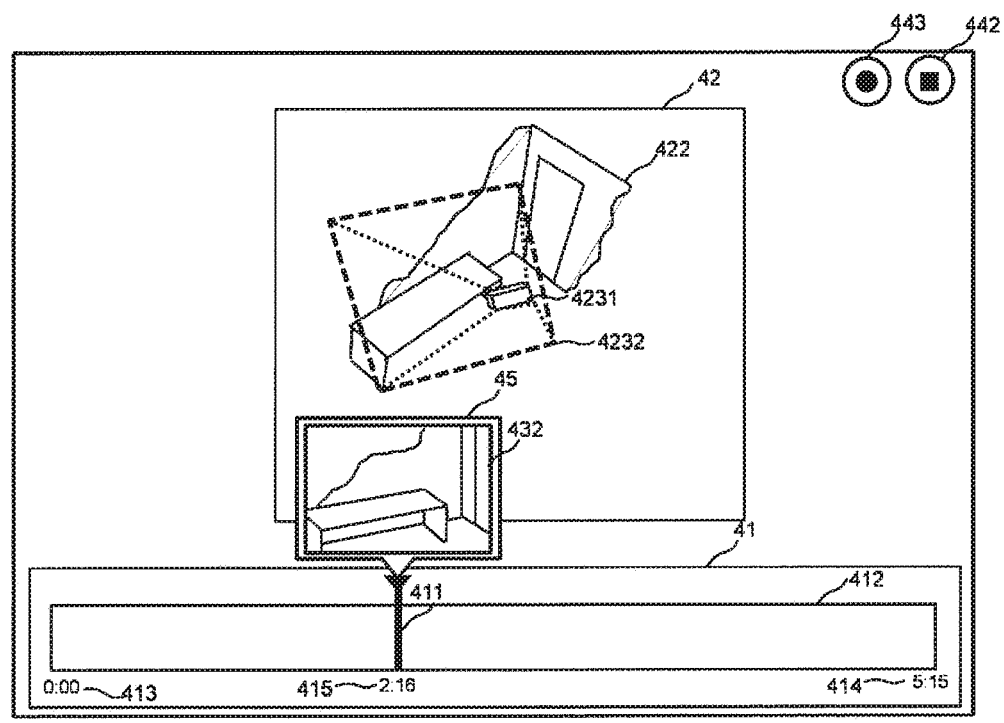
FIG. 10 is a block diagram illustrating a display screen at temporary stop of the map data generation in the third embodiment of the present invention.

FIG. 10 is a diagram illustrating one example of a display screen at the time of the temporary stop of the map data generation in the present embodiment. A position-posture display 4231 and a measuring range 4232 are rendered in addition to the screen in FIG. 7. For target-position data expressed by the six degrees of freedom corresponding to translation and rotation, the rendering unit 15 renders a display indicating the data entry device 2 (i.e., the position-posture display 4231) onto a three-dimensional logical coordinate system. The rendering unit 15 further projects the measurement data image at this time onto the three-dimensional logical coordinate system, and renders the result as the measuring range 4232 to output the result to the output device 4. Here, the positional information about the target-position data is a concept including not only the position of the data entry device 2 in three-dimensional view, but also the posture of the data entry device 2.

The aforementioned process allows the user to easily decide a location to go back, and a region to be measured by the data entry device 2 at the time of the restart by referring to the position and posture of the data entry device 2 and the measuring range displayed on the map data at the designated time, and allows the user to smoothly move to the location at the time to generate the map data.

It is noted that only one of the position-posture display 4231 and the measuring range 4232, rendered by the rendering unit 15, may be displayed. It is also noted that the edit unit 14 may acquire the target-position data at a time on or before the designated time, and control the rendering unit 15 to perform rendering, including a path on which the data entry device 2 has moved on or before the designated time. The differences between the present embodiment and the first and second embodiments has been described. The other configuration is similar to those in the first and second embodiments.

Fourth Embodiment

In the measurement of spatial map data using the aforementioned map data generators, the user searches for a time at which an error has occurred while checking, every time, the measurement data and the map data at a time that is input in sequence, in order to designate a time on or before the time at which the error has occurred in the map data. A cause of the error occurrence in the map data is that in some cases, the measurement data pieces cannot be matched during mapping (this state is referred to as a lost state); because the update of the map data follows the stop of the map data generation, improper mapping can be performed depending on environments.

There is probably an error found in the update of the map data, at a point where the update process is performed again after the occurrence of such a lost state. The user currently has no choice but to find out the site of the error occurrence without any help. For instance, the user will search for the site while looking at the measurement data pieces and the map data pieces in chronological order. Thus, the user will have to decide, by himself or herself, which time point a possible error has occurred in the update of the map data, and thus will have to spend some time to find out the error.

The wording, "a lost state" is a state in which the measurement data pieces cannot be matched and in which the map data cannot be generated and updated with such measurement data pieces. When there is a lost state found, a new measurement data piece that is different from the measurement data piece at the time of determination of the lost state, is received, and the generation and update of the map data proceed.

In view of this point, in the present embodiment, detecting a lost state, and providing the user with the duration of the lost state allow the user to easily recognize a time at which an error has possibly occurred in the map data, and to smoothly designate the designated time.

Figure 11:
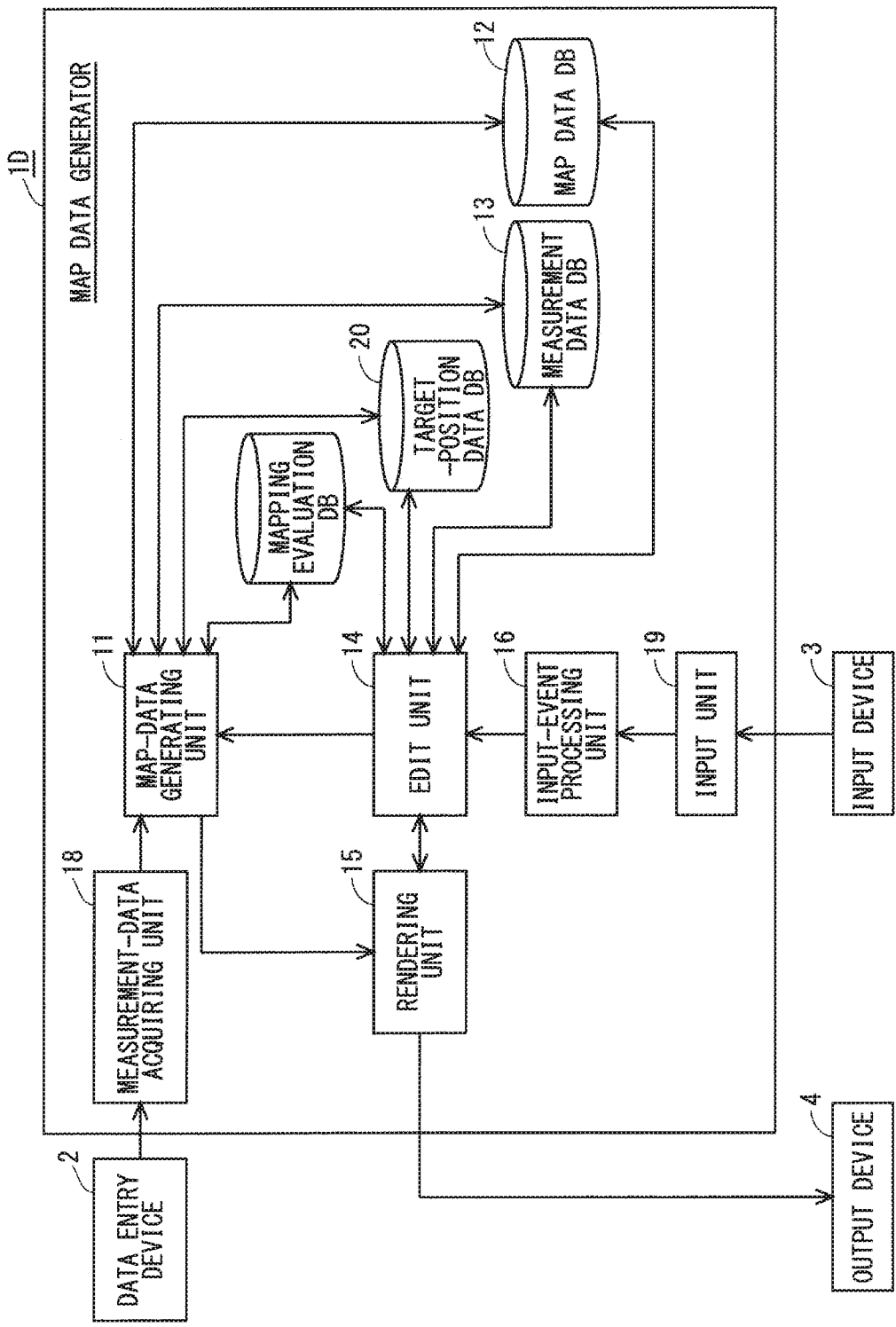
FIG. 11 is a block diagram illustrating a map data generator according to a fourth embodiment of the present invention.

FIG. 11 is a diagram illustrating the configuration of a map data generator in a fourth embodiment. A map data generator 1D includes a mapping evaluation DB 17 in addition to the configuration in the third embodiment. The mapping evaluation DB 17 stores, together with the time data, data about the presence or absence of a lost state in chronological order. The map data generator in the present embodiment is different from those in the aforementioned embodiments in that the map-data generating unit 11 determines a lost state, and that the rendering unit 15 displays the determination of the lost state onto an output device, such as a screen. The determination of the lost state is made by extracting, every time the measurement data is acquired, a plurality of features from each of a measurement data piece as acquired and another measurement data piece contiguous to the acquired measurement data piece, and then by determining whether the number of matching features is smaller than or equal to a threshold. The number of matching features indicates the number of features matching with each other among the plurality of features. The details will be described later on.

Figure 12:
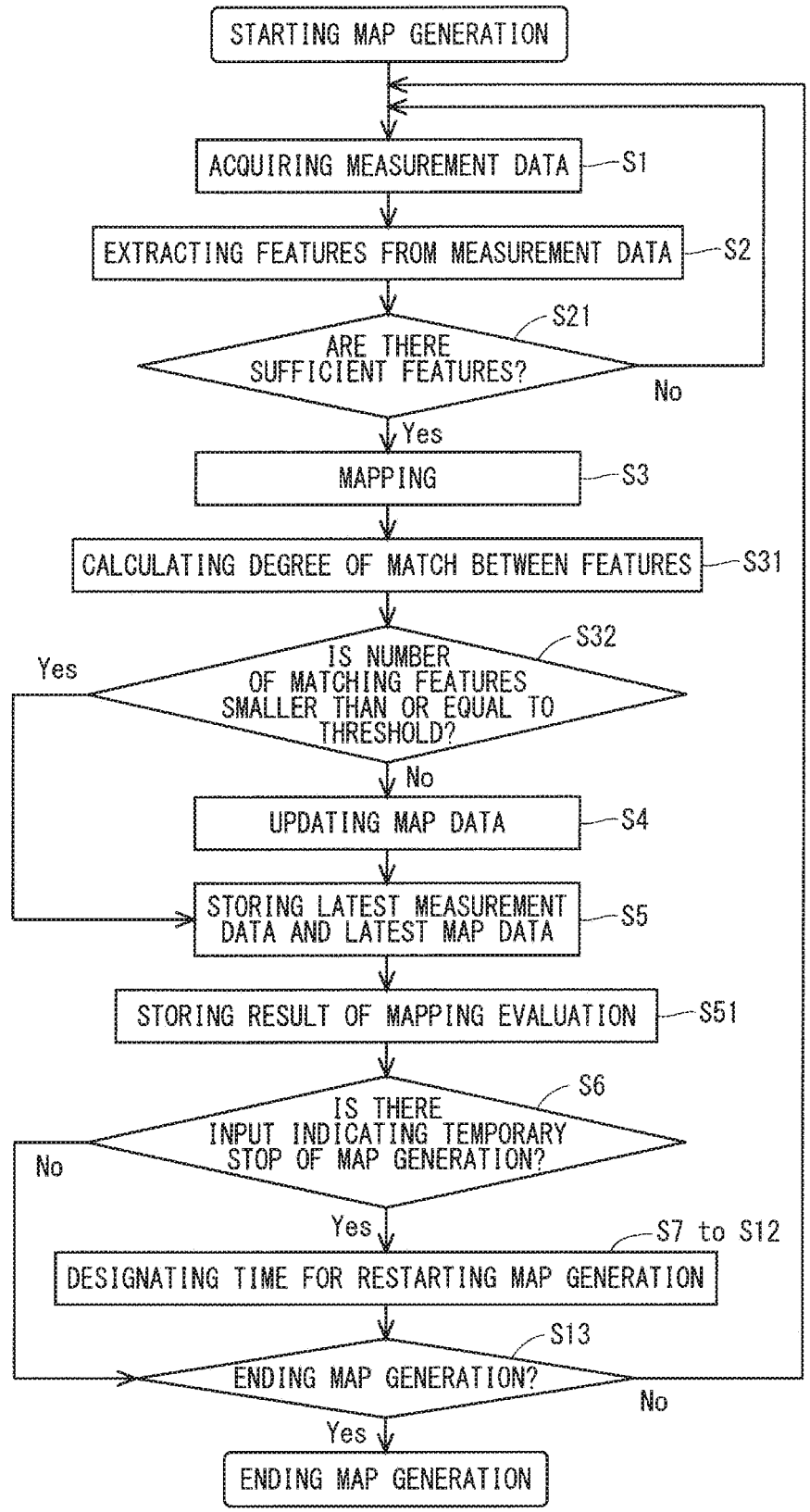
FIG. 12 is a flowchart showing the operation of a map-data generating unit in FIG. 11.

FIG. 12 is a flowchart showing the operation of the map-data generating unit 11 in the fourth embodiment. The following describes the process relating to the map data generator 11 in FIG. 12 with reference to the flowchart. FIG. 12 shows some of the process steps extracted from the overall flowchart in FIG. 4, and shows additional process steps relating to the determination of a lost state (i.e., step S31, step S32, and step S51). First, the map-data generating unit 11 acquires a measurement data piece (i.e., step S1), and then extracts features (i.e., step S2).

Here, the map-data generating unit 11 determines whether there are minimal features necessary for mapping (i.e., step S21). If No, the map-data generating unit 11 acquires another measurement data piece again (i.e., step S1), followed by this determination step. If Yes, the map-data generating unit 11 performs mapping based on the extracted features (i.e., step S3).

At this stage, the map-data generating unit 11 calculates the degree of match between the features when the measurement data pieces are superimposed on each other (i.e., step S31). To be specific, the map-data generating unit 11 finds a common feature from at least two pieces of measurement data, and performs coordinate transformation in such a manner that the features of the individual measurement data pieces are superimposed on each other in three-dimensional space, followed by calculating the number of common features (i.e., the number of matching features) among all the features within the measurement data pieces. The map-data generating unit 11 then determines whether the number of matching features is smaller than or equal to a threshold to determine whether a lost state has occurred (i.e., step S32).

If the number of matching features exceeds the threshold, the map-data generating unit 11 updates the map data (i.e., step S4). If the number of matching features does not exceed the threshold, the map-data generating unit 11 determines that there is a lost state; the process then proceeds to step S5 of relating the latest measurement data and map data with the time data to store these data pieces. Here, for a time at which a lost state is determined to have occurred, the map-data generating unit 11 stores the same map data as that in the previous process (i.e., the same map data as that at the immediately preceding time). The map-data generating unit 11 then stores, using the same time data as that in step S5, the result of the lost-state determination in the mapping evaluation DB 17.

The map-data generating unit 11 stores the result of the lost-state determination in the following specific way: the map-data generating unit 11 stores the result of the lost-state determination by storing the time data and storing numerals related with the time data, such as 0 indicating there is no lost state found, and 1 indicating there is a lost state found. The map-data generating unit 11 then sends the result of the lost-state determination (i.e., 0 or 1) to the rendering unit 15, together with the measurement data, the map data, and the time data in the current frame. The following describes the process in the rendering unit 15.

Figure 13:
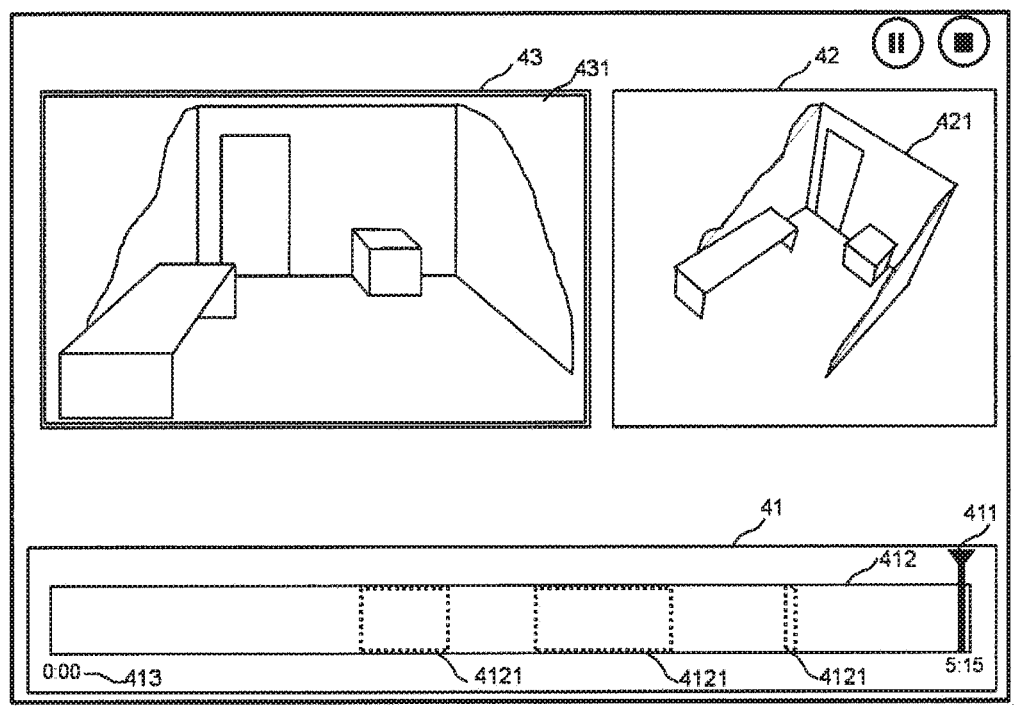
FIG. 13 is a diagram illustrating a display screen during map data generation in the fourth embodiment of the present invention.

FIG. 13 is a diagram illustrating one example of a screen rendered on the output device 4 during the map data generation. Displayed on the bar 412 of the seek bar 41 is a lost-state display component 4121, indicating the time or duration of the occurrence of a lost state. When the result of the lost-state determination indicates the occurrence of a lost state, the rendering unit 15 displays the lost-state display component 4121 at the latest time position on the bar 412.

The rendering unit 15 keeps the result of the lost-state determination at the time of processing the previous frame, for instance; the rendering unit 15 refers to the result of the lost-state determination in the previous frame, and when there are continuous lost states, the rendering unit 15 renders the lost-state display component 4121 over a plurality of time periods. When there are discrete lost states, the rendering unit 15 displays a new lost-state display component 4121. This rendering process is performed for each frame processing with a display region on the bar 412 per unit time being regulated as the time at which the map data is generated increases, as with the corresponding process in the second embodiment. In this way, the rendering is updated.

The following describes a process that is performed when the map data generation is temporarily stopped, followed by the input of the designated time. When the map data generation is temporarily stopped, followed by the input of the designated time, the edit unit 14 performs the aforementioned process, and also acquires all the stored tune data pieces and all the stored results of the lost-state determination from the mapping evaluation DB 17. The edit unit 14 then sends, to the rendering unit 15, the results of the lost-state determination together with an instruction to render a screen at the time of the temporary stop. The rendering unit 15 renders the screen at the time of the temporary stop.

Figure 14:
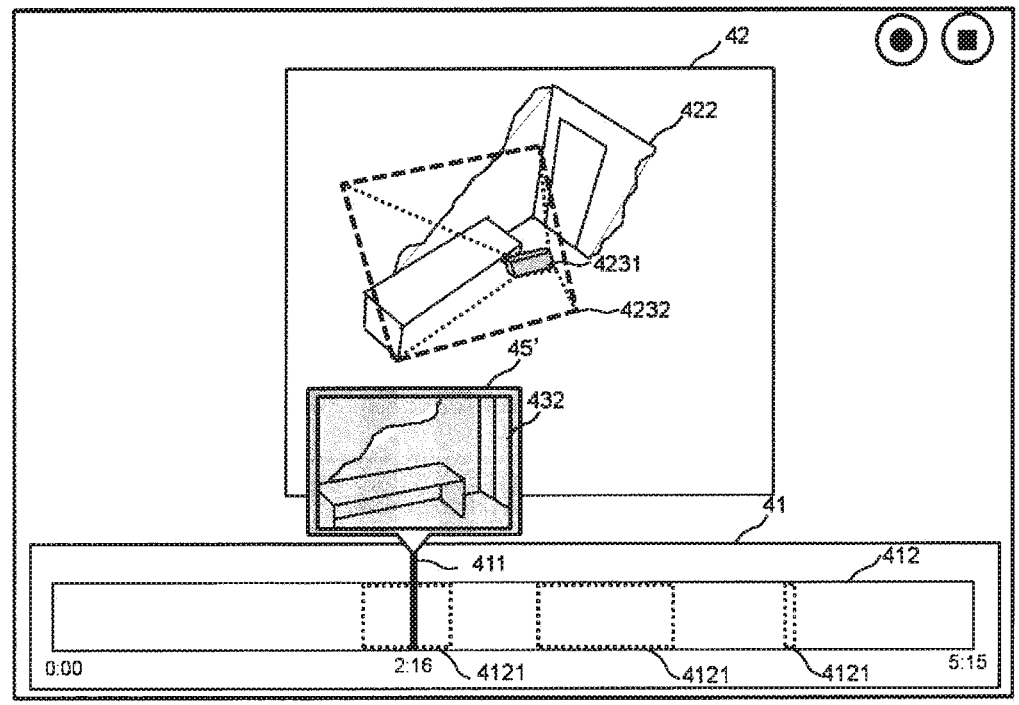
FIG. 14 is a diagram illustrating a display screen at temporary stop of the map data generation in the fourth embodiment of the present invention.

FIG. 14 is a diagram illustrating one example of the screen rendered on the output device 4 at the time of the temporary stop of the map data generation (i.e., the designated screen at the designated time), in the present embodiment. Displayed on the bar 412 of the seek bar 41 is the lost-state display component 4121, indicating the time or duration of the occurrence of a lost state. The rendering unit 15 displays a lost-state display component at a position on the bar 412 that falls on the time of the occurrence of a lost state (i.e., the time data at which the result of the lost-state determination indicates 1), on the basis of the time data and the result of the lost-state determination, which are sent from the edit unit 14. It is noted that the rendering unit 15 needs to display that there is a lost state found, onto an output device, such as a screen; the rendering unit 15 may display this determination result in any form. How to express the lost-state display component 4121 is not limited to the aforementioned manner. It is also noted that the display of the seek bar 41 as finally rendered in the map data generation may be used as it is.

When the rendering unit 15 calculates the time after the movement of the slider 411 in response to an operation of the slider 411, a determination is made whether the time after the movement is a lost-state time period. Examples of how to make this determination include referring to the result of the lost-state determination that corresponds to the calculated time, and determining whether the rendering position of the slider 411 is included in a region forming a lost-state display component.

What is now being displayed on the seek bar 41 is a measurement-data display region 45' in the case where the slider is overlapping the lost-state display component. If the time after the movement is determined to be a lost-state time period, the rendering unit 15 renders a display indicating the lost-state time period (i.e., the display with hatching in the example) to the user, like the measurement-data display region 45'. When receiving the designated time for restarting the map data generation, and then updating the map data, the edit unit 14 updates new map data from the designated time, like the aforementioned process.

The above configuration and process provide the duration of a lost state on the seek bar, thereby allowing the user to recognize the time when the lost state has occurred at a glance. When the user designates a time to restart the map data generation, the above configuration and process allow the user to narrow the time for the restart down to the vicinity of the time when the lost state has occurred, and to then check the state of the map data at the time to go back. This reduces the user's burden of operation for establishing a suitable time. In addition, the above configuration and process enable Checking for the occurrence of a lost state during the map data generation. This further helps the user decide the timing to stop the map data generation, thereby allowing the user to early redo the map data generation.

It is noted that for the occurrence of a lost state during the map data generation, the rendering unit 15 may render a display indicating the lost state (e.g., display with hatching) onto the measurement-data rendering region 43 or the map-data rendering region 42. It is also noted that instead of displaying the duration of the lost state with hatching, as with the one in the measurement-data display region 45', the rendering unit 15 may display the duration of the lost state, as with the one in the measurement-data display region 45 in the previous embodiment. It is also noted that the rendering unit 15 may render a display indicating the duration of the lost state (e.g., display with hatching) onto the map-data rendering region 42.

It is also noted that for the occurrence of a lost state during the measurement, the rendering unit 15 may provide the user with a message stating the occurrence of the lost state and with a message instructing how to deal with the lost state (e.g., an instruction to go back to a measurement site that is slightly anterior to the site where the lost state has occurred). When the map-data generating unit 11 determines that there is a lost state found, the rendering unit 15 displays the determination of the lost state onto a screen; the determination may be displayed in any form.

A lost state is a phenomenon indicating one possibility that can cause the degradation in the accuracy of the map data; the accuracy of the map data does not necessarily degrade. Let the data entry device 2 be moved at a speed such that the measurement data does not overlap that in the previous frame, and let a lost state consequently occur. Accordingly, in the case where there are many features in the environment, and other cases, going back to the original position enables the restart of the map data generation to continue without degrading the accuracy of the map data.

In view of this point, the map data generator in the present embodiment further evaluates the accuracy of mapping and makes the result of the evaluation visible, thereby showing the degradation in the accuracy of the map data to help the user redo the map data generation.

The map data generator in the present embodiment is different from those in the previous embodiments in the following points: the map-data generating unit 11 performs an additional process step of evaluating the accuracy of the map data accuracy; the mapping evaluation DB 17 stores the result of the evaluation of the map data accuracy; and the rendering unit 15 outputs a mapping evaluation value.

Figure 15:
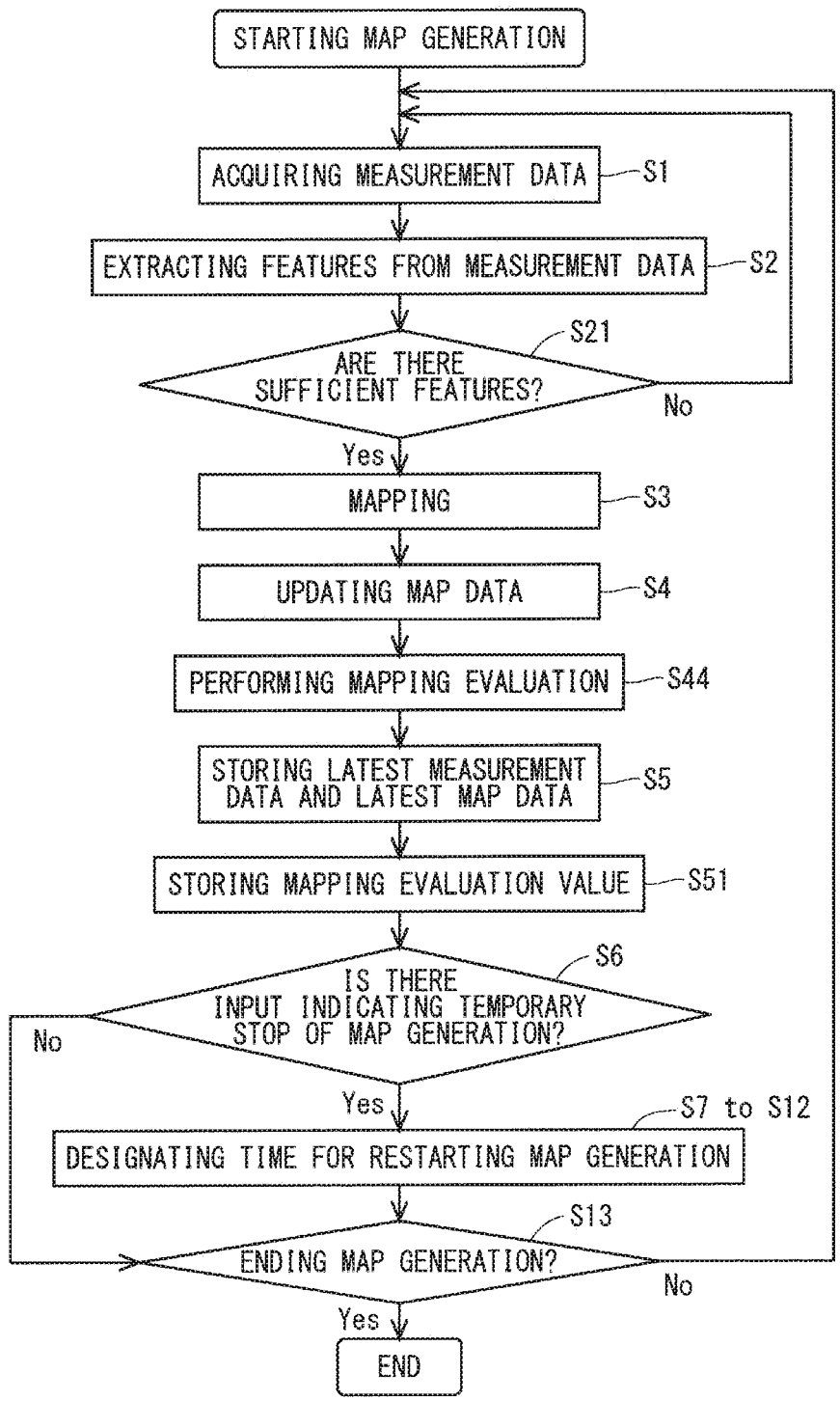
FIG. 15 is a flowchart showing the operation of the map data generator according to the fourth embodiment of the present invention.

FIG. 15 is a flowchart showing one example of process steps in the map data generator in the present embodiment. These process steps include the process steps in the first embodiment. The following describes the process in the map-data generating unit 11 with reference to the flowchart. The acquiring of the measurement data (i.e., step S1) to the updating of the map data (i.e., step S4) are the same as those previously described.

After updating the map data (i.e., step S4), the map-data generating unit 11 evaluates the result of the map data update using the features in the current frame (i.e., step S44). Examples of a cause of an error found in the map data include a physical measuring error in a sensor included in the data entry device 2, an error in the target-position data in the data entry device 2 (e.g., an error in estimating the target position and an error in measuring the position and the posture), and an error in the coordinates of a feature point as mapped in three-dimensional space.

An example of how to evaluate the result of the map data update is a method using an error in re-projecting the feature. This method includes re-projecting a newly mapped position (coordinates) of the feature in three-dimensional space onto the measurement data (i.e., 2D image), and calculating an error between the re-projected coordinates and the coordinates of the feature of the original measurement data. This method enables determination that the smaller the error is, the more accurately the map data generation has been done. This method is a basic evaluation method in the field of this art.

Another possible method is to use at least one of the misdistribution and density of the distribution of the features within the measuring field of view of a sensor included in the data entry device 2. The relatively wider range the distribution of the features has, and the more there are features, the smaller the error tends to be in the mapping. Accordingly, the map data generation is determined to have high accuracy. Further, the relatively narrower range the features are unevenly distributed in, and the less the features are, the error tends to be large in the mapping. Accordingly, the map data generation is determined to have low accuracy.

The map-data generating unit 11 evaluates the map data using one of the foregoing methods or both to calculate the mapping evaluation value on the basis of a statistic. The evaluation value is calculated, for instance, as a value that is rated on a several-level basis. After that, the map-data generating unit 11 stores the latest measurement data and the latest map data (i.e., step S5), followed by storing the mapping evaluation value. The mapping evaluation value is stored in the mapping evaluation DB 17 together with the same time data as that related with the measurement data and the map data. The map-data generating unit 11 then sends data necessary for updating a screen, including the mapping evaluation value, to the rendering unit 15.

Figure 16:
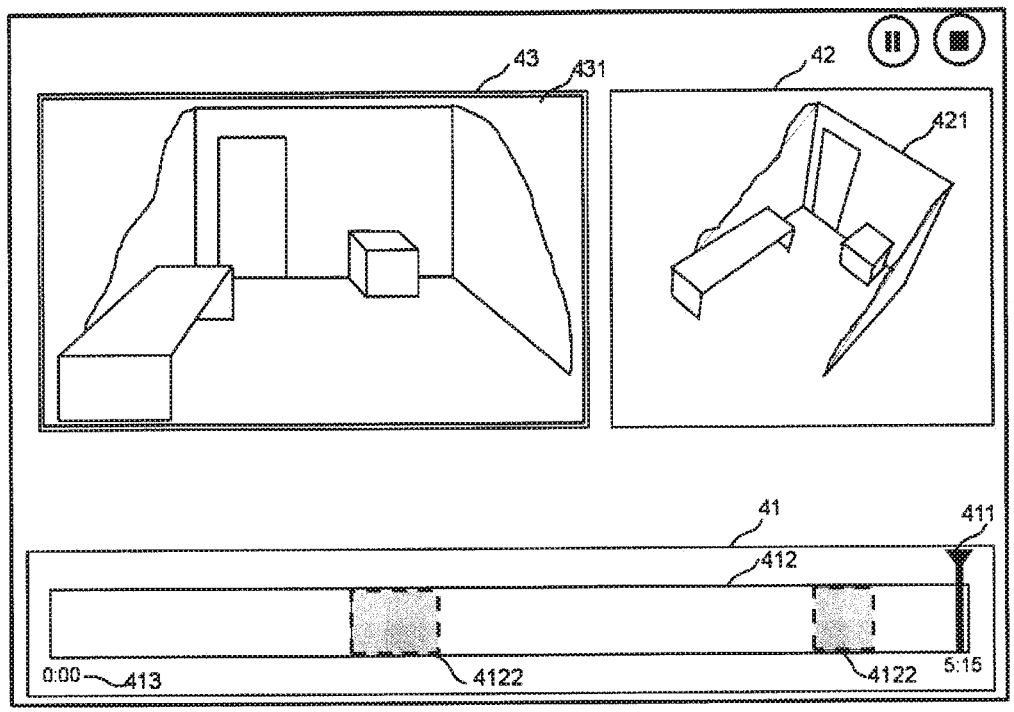
FIG. 16 is a diagram illustrating a display screen during the map data generation in the fourth embodiment of the present invention.

FIG. 16 is a diagram illustrating one example of a screen displayed on the output device 4 during the map data generation. On the bar 412 of the seek bar 41, a low-mapping-accuracy time period 4122 is rendered that is based on the acquired mapping evaluation value. In the example in FIG. 16, the low-mapping-accuracy time period 4122 is displayed based on the mapping evaluation value that is rated on, but not limited to, two levels: one indicates that the mapping evaluation value is good; and the other, bad. An evaluation value rated on a multi-level basis may be established, and the aforementioned period may be displayed in a further detailed manner (e.g., the evaluation value is displayed in such a manner that a particularly good time period, a good time period, a bad time period, a particularly bad period, for instance, can be recognized). A rendering method is similar to the aforementioned display of the lost state.

Figure 17:
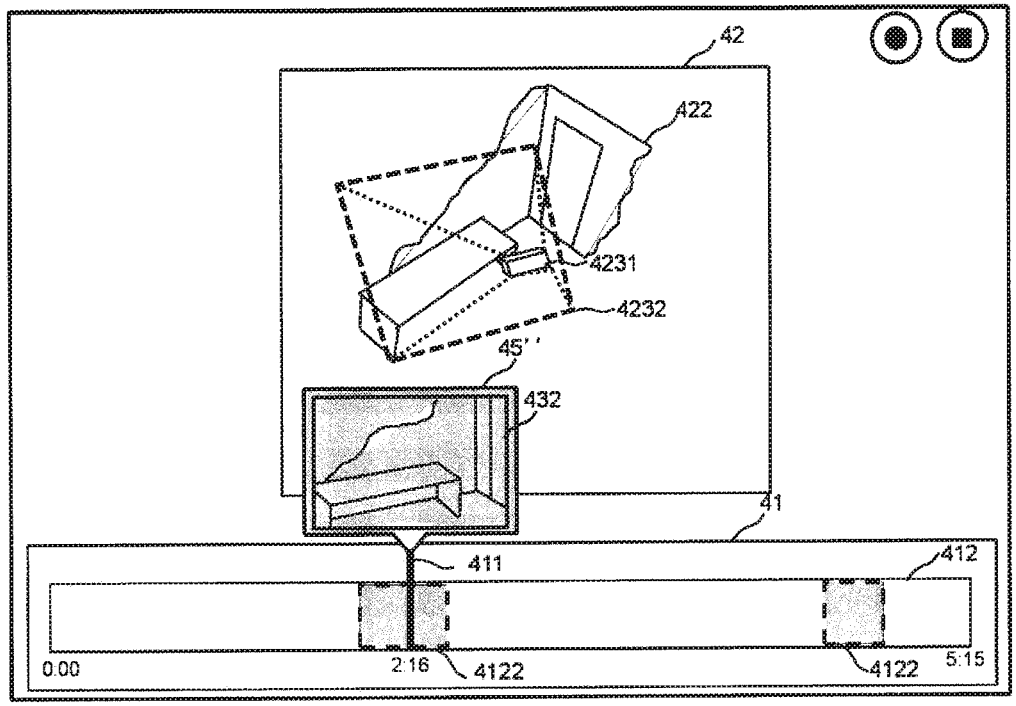
FIG. 17 is a diagram illustrating a display screen at temporary stop of the map data generation in the fourth embodiment of the present invention.

FIG. 17 is a diagram illustrating one example of a screen display during the temporary stop of the map data generation. In this case as well, the low-mapping-accuracy time period 4122 is likewise displayed on the bar 412. When the slider 411 falls at the time of the low-mapping-accuracy time period 4122, a display indicating low mapping accuracy (e.g., hatching) is rendered on the measurement data 45" in the same manner as those described above. How to render the display is similar to the aforementioned display of the lost state.

The above configuration and process enables accuracy evaluation of the result of mapping process execution using the measurement data in a predetermined measuring frame, thereby providing the user with the result thereof. This allows the user to recognize a time point at which the mapping has low accuracy, during the measurement, and allows the user to stop the map data generation at this time point and to redo the map data generation. This also allows the user to decide a site at which the mapping has low accuracy as an additional help for designating a time to redo the map data generation. Consequently, the efficiency of the map data generation improves.

It is noted that for a degradation in the mapping accuracy during the measurement, the rendering unit 15 may inform the user of the degradation and how to deal with the degradation in the form of a massage. The foregoing has described the differences between the fourth embodiment and the first to third embodiments. The other configuration is similar to those in the first to third embodiments.

Fifth Embodiment

The aforementioned map data generators enable, after a time point in the past for redoing the map data generation is input, redoing the map data generation from the time point.

In some cases, the accuracy of the map data in a predetermined time period is low. In these cases, the generation needs to be redone from a time point on or before the degradation in the accuracy of the map data, including a time period thereafter during which the map data has normal accuracy.

In view of this point, the map data generator in a fifth embodiment is configured such that the map data during a time period as designated is deleted (dropped). The map data generator in the present embodiment is different from those in the aforementioned embodiments in the following points: the input-event processing unit 16 determines an event relating to dropping; the edit unit 14 performs dropping; and the rendering unit 15 renders an interface for dropping. The following describes the details on the basis of the configuration in the fourth embodiment.

The edit unit 14 performs dropping while the map data generation is being temporarily stopped. The edit unit 14 performs this process through the following process steps: upon use's input of a request for starting a drop edit, the edit unit 14 establishes a drop start time and a drop end time using a dropping interface; and the edit unit 14 performs dropping after determining these times. The edit unit 14 checks, as the time data, the designated drop start time and the designated drop end time against the map data DB 12 to identify the map data that has been updated from the drop start time to the drop end time, and deletes the identified map data. The details will be described later on.

The input-event processing unit 16 detects a drop-edit start event, operational events relating to the drop start time and the drop end time, and a drop execution event, and the input-event processing unit 16 sends these events to the edit unit 14. The edit unit 14 instructs the rendering unit 15 to perform rendering for performing dropping, and also respectively deletes the measurement data, the map data, and the target-position data in the designated drop time period from the measurement data DB 13, the map data DB 12, and the target-position data DB 20. The rendering unit 15 makes an interface that designates the drop time period and a site to undergo dropping visible on the map data, and renders an interface for instructing the dropping execution.

Figure 18:
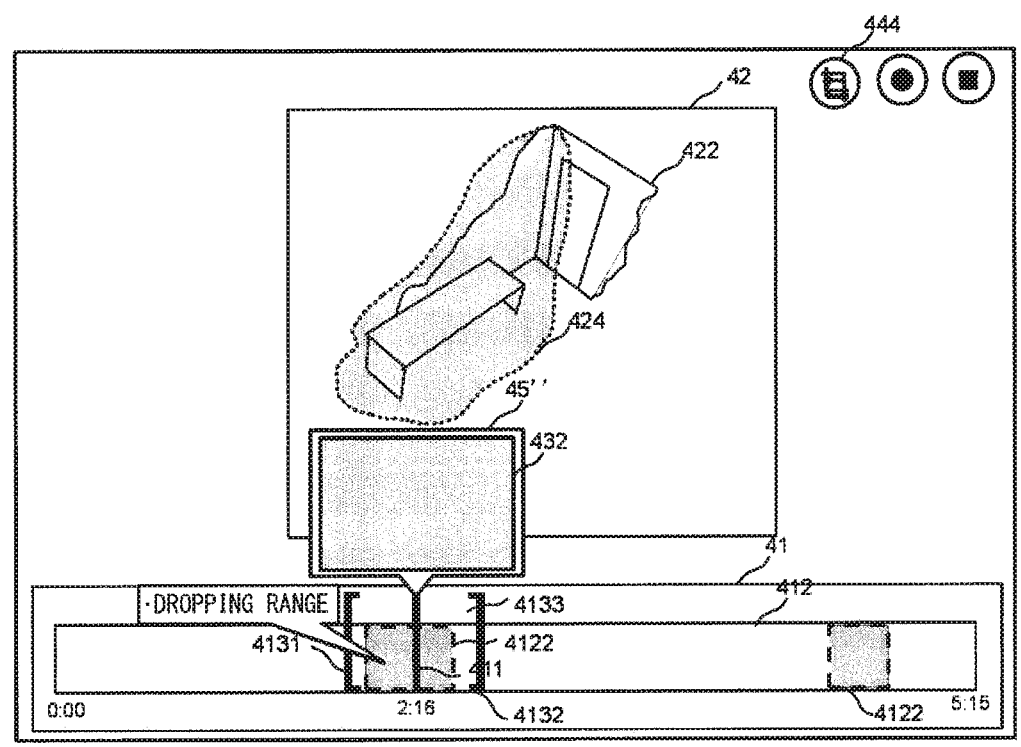
FIG. 18 is a diagram illustrating a display screen at temporary stop of map data generation in a fifth embodiment of the present invention.

FIG. 18 is a diagram illustrating a display screen during the temporary stop of the map data generation, in the present embodiment. The following describes specific process steps with reference to the screen in FIG. 18 that is output during the stop of the map data generation. FIG. 18 additionally shows a drop start bar 4131, a drop end bar 4132, a drop time period 4133, a map data to be dropped 424, and a drop execution button 444.

First, the input-event processing unit 16 detects the drop-edit start event, which is input via the input unit 19, and sends a signal to the edit unit 14, during the temporary stop of the map data generation. For instance, upon receiving the user's operation of holding down any site on the seek bar 41, the input-event processing unit 16 may perform such detection; alternatively a drop-edit start button may be separately provided. Subsequently, the edit unit 14 sends an instruction to render interfaces for designating a drop time period (i.e., drop start bar 4131, drop end bar 4132, and drop time period 4133) to the rendering unit 15. The rendering unit 15 then executes rendering.

The input-event processing unit 16 then detects operational events relating to the drop start bar 4131 and the drop end bar 4132 via the input unit 19 to send a signal to the edit unit 14. The edit unit 14 acquires the map data in the drop time period. To be specific, the edit unit 14 checks, as the time data, the designated drop start time and the designated drop end time against the map data DB 12 to identify the map data that has been updated from the drop start time to the drop end time, and deletes the identified map data.

To be more specific, the edit unit 14 acquires the map data at the drop end time and the map data at the time immediately preceding the drop start time, and calculates a difference between the two map data pieces to thus acquire the map data added during the drop time period. The edit unit 14 then sends, to the rendering unit 15, an instruction to update the rendering of the drop start bar 4131 and the rendering of the drop end bar 4132, an instruction to make the additional map data in the drop time period visible, and the map data of the difference.

The rendering unit 15 updates the rendering of the drop start bar 4131, the rendering of the drop end bar 4132, and the rendering of the drop time period 4133 between the drop start and the drop end. The rendering unit 15 also renders and updates the map data to be dropped 424 onto the map data 422. Here, the difference between the two map data pieces is a portion of the map data that has been updated in the drop time period. An example of such a portion is a portion of the map data part of which has been updated.

Upon detection of an input of the drop execution button 444 in the input-event processing unit 16, the edit unit 14 executes dropping. The edit unit 14 respectively deletes the measurement data, the map data, and the target-position data at the time data included in the drop time period, from the measurement data DB 13, the map data. DB 12, and the target-position data DB 20.

The edit unit 14 then deletes the map data of the calculated difference, from all the map data pieces at the time data pieces on or after the drop end time, the map data pieces being stored in the map data DB 12. As a result of this deletion, the portion updated in the drop time period is deleted from the map data. The deleted portion, which has now no data, is filled in with black or other colors for display.

After the deletion from the map data DB 12, the edit unit 14 sends an instruction to update rendering to the rendering unit 15. The rendering unit 15 renders the bar 412 except the drop time period onto the seek bar 41, and stops rendering the drop start bar 4131 and the drop end bar 4132. The slider 411, when established at a time within the drop time period, is slid back and forth for instance; accordingly, the rendering unit 15 acquires the map data 422 at the time data closest to the time is acquired from the map data DB 12 via the edit unit 14, and renders the map data 422. The rendering of the map data to be dropped 424 is erased.

For a time period when accuracy is partly low at some midpoint of the map data generation, the above process enables deletion of only the map data added in this low-accuracy time period. This allows the user to easily delete only the map data with low accuracy, and eliminates the need for wholly redoing the map data generation on or after a predetermined time, thereby improving the efficiency of the process for generating the map data.

It is noted that the edit unit 14 may separately store various dropped data pieces while executing dropping, so that the edit unit 14 can reverse (undo) its operation after dropping. It is also noted the edit unit 14 may control the deletion through dropping and the difference of the map data added through additional map data generation, so that the edit unit 14 can go back to pre-map-data-generation and pre-drop-execution.

The foregoing has described an example of a map data generator that manually deletes (drops) the map data generated and updated during a predetermined time period, such as a time period during which accuracy degrades. The user unfortunately needs to check for degradation in the accuracy, to temporarily stop the map data generation, and to manually input a time period, every time the user executes deletion. The more there are sites with unfavorable accuracy, the more significant the burden of processing tends to be placed on the user.

In view of this point, the map data generator in the present embodiment may be configured to automatically drop a time period during which the accuracy degrades. The process in the map data generator in the fourth embodiment may include an additional process step of not reflecting the result of the mapping process to the map. The process proceeds to this additional process step if the result of the mapping evaluation indicates low mapping accuracy. In this case, the map-data generating unit 11 controls updating of the measurement data and of the map data on the basis of the result of the map data evaluation.

Figure 19:
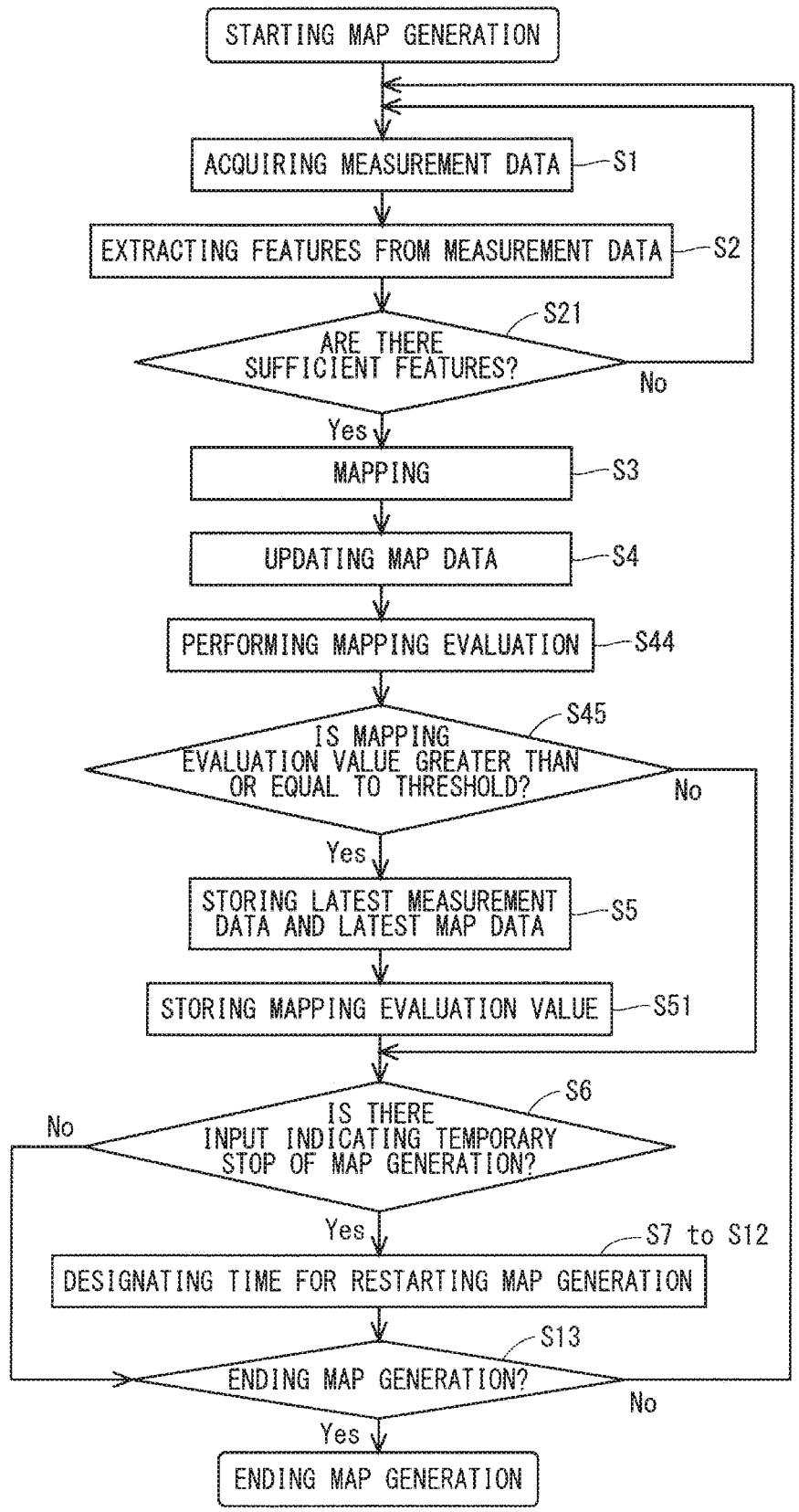
FIG. 19 is a flowchart showing the operation of a map data generator according to the fifth embodiment of the present invention.

FIG. 19 is a flowchart showing the process in the map data generator. After updating and evaluating the map data (i.e., steps S4 to S44), the map-data generating unit 11 performs separate process steps in accordance with values of the map data evaluation (i.e., step S45). If the evaluation value is less than an established threshold, the map-data generating unit 11 generates a signal indicating a low evaluation value, followed by ending the process in the present frame, without storing the measurement data and the map data in the database, and without storing the mapping evaluation value (i.e., step S5 and step S51). That is, if the value of the map data evaluation is greater than or equal to the threshold, the process proceeds to a process step of storing the measurement data and the map data in the database, and of storing the mapping evaluation value.

The map-data generating unit 11 does not send the latest measurement data and the latest map data to the rendering unit 15; instead, the map-data generating unit 11 generates the time data in the frame, and sends the time data together with a signal indicating a low evaluation value to the rendering unit 15. Upon receiving the signal indicating the low evaluation value, the rendering unit 15 updates the rendering of the seek bar 41 (note that the map data 422 and the target-position data remain non-updated).

Figure 20:
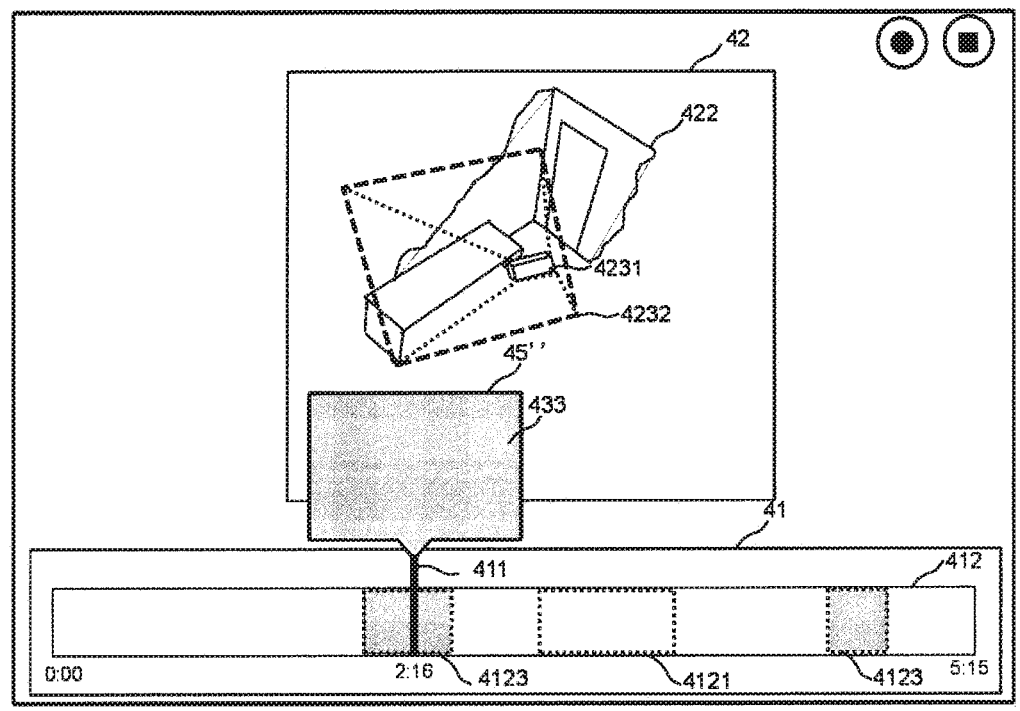
FIG. 20 is a diagram illustrating a display screen at temporary stop of the map data generation in the fifth embodiment of the present invention.

FIG. 20 is a diagram illustrating one example of a screen during the stop of the map data generation. The drawing shows a drop time period 4123 rendered on a seek bar, and a drop display 433 rendered on a measurement-data display region. The rendering unit 15 uses the signal indicating the low evaluation value, and the time data, to render the drop time period at this time. When the slider 411 is operated to move onto the drop time period, the rendering unit 15 renders the drop display in a measurement-data rendering region 43 or above, like the rendering of the lost state in the fourth embodiment. It is noted that the rendering unit 15 may render, onto the map-data rendering region 42, a display (e.g., display with hatching) indicating that the current frame exhibits low mapping accuracy, and that the drop process has been thus performed.

Such a map data generator does not update a mapping result indicating low mapping accuracy, as the map data. This eliminates the need for the user to manually drop the map data if the accuracy degrades, thus further improving the efficiency of the generation of map data with high accuracy. The foregoing has described the differences between the fifth embodiment and the first to fourth embodiments. The other configuration is similar to those in the first to fourth embodiments.

Sixth Embodiment

In order to stop the map data generation and redo the map data generation from the designated time, displaying the measurement data at the designated time provides the user with where to go back. Unfortunately, the designated time or the measurement data at the designated time does not properly overlap the imaging range of the data entry device 2 in some cases, because the user cannot recognize the imaging range of the data entry device 2 moved at the time of going back. Consequently, the mapping accuracy at the time of the restart of the map data generation can degrade.

In view of this point, the map data generator may be configured to display the measurement data that is currently being measured by the data entry device 2, when establishing a time (i.e., designated time) for stopping and redoing the map data generation. The edit unit 14 acquires the measurement data (e.g., an RGB image), measured in each frame, from the data entry device 2 while stopping the map data generation, and sends the measurement data to the rendering unit 15 every time the edit unit 14 acquires the measurement data.

Figure 21:
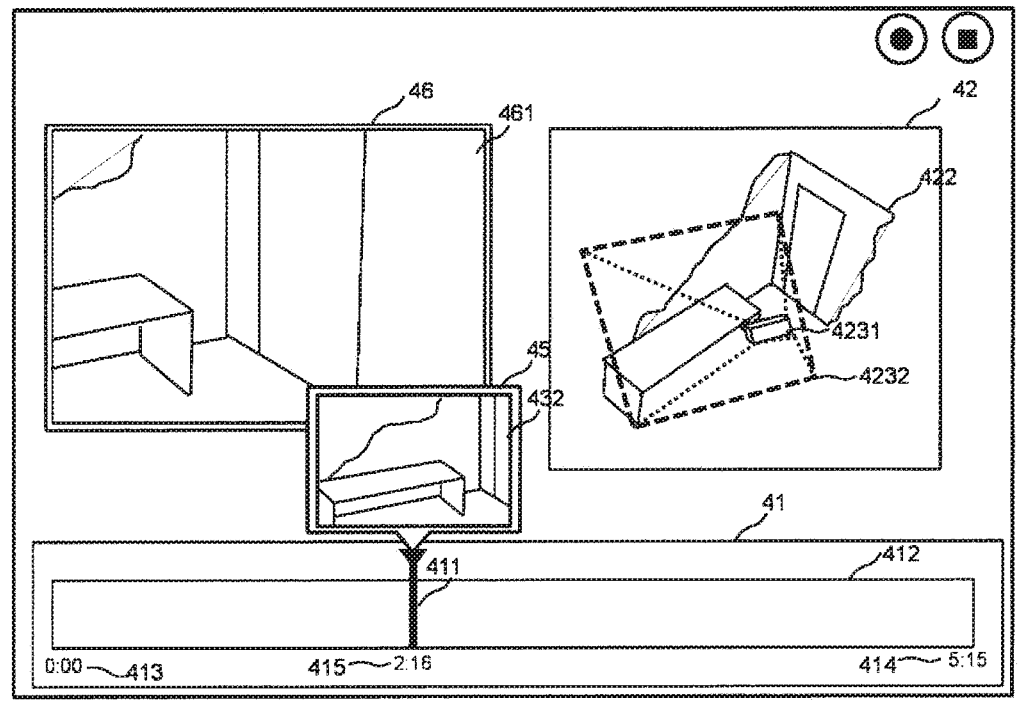
FIG. 21 is a diagram illustrating a display screen during map data generation in a sixth embodiment of the present invention.

FIG. 21 is a diagram illustrating one example of a screen rendered by the rendering unit 15. FIG. 21 shows a current-measurement-data rendering region 46 and a current measurement data 461 as well as what are shown in FIG. 10. The current measurement data 461 is measurement data in the data entry device 2 received by the rendering unit 15. The rendering unit 15 updates rendering in each frame.

As described, the current measurement data 461, measured by the data entry device 2, is made to be visible when the user goes back to a position in the past. This allows the user to compare the current measurement data 461 with the measurement data 432 in the past, and to thus go back to a suitable position more speedily. The foregoing has described the differences between the sixth embodiment and the first to fifth embodiments. The other configuration is similar to those in the first to fifth embodiments.

Seventh Embodiment

The map data generator in the sixth embodiment performs the establishment of a time for redoing the map data generation, the movement to a location at the time, and the restart of the map data generation, on the basis of the measurement data in the past and the current measurement data, and on the basis of information about the map data in the past and other information. Unfortunately, even if the use successfully goes back properly to a location at a time as established, the user fails to start joining, or the mapping accuracy degrades, in some cases. Such an unfavorable situation occurs when, for instance, there are few features in this location. In such a case, the user needs to establish the designated time again, and redo the map data generation, after restarting the map data generation.

In view of this point, a map data generator in a seventh embodiment is configured to evaluate, when redoing the map data generation, whether restarting the map data generation using the measurement data in situ and the map data at an established time achieves proper joining (mapping), and to provide the user with the result of the evaluation. The user can see the evaluation result to restart the update of the map data. This saves time and effort for redoing the generation of useless, incorrect map data.

The map data generator in the present embodiment is different from those in the aforementioned embodiments in the following points: the map-data generating unit 11 evaluates the accuracy of mapping prediction at the time of the restart of the map data generation, using the current measurement data, acquired by the data entry device 2 while the map data generation is being temporarily stopped; the edit unit 14 acquires the result of the evaluation from the map-data generating unit 11, and sends the evaluation result to the rendering unit 15; and the rendering unit 15 renders the evaluation result. The following describes a process after the temporary stop of the map data generation, with reference to the process steps in FIGS. 22 and 23.

Figure 22:
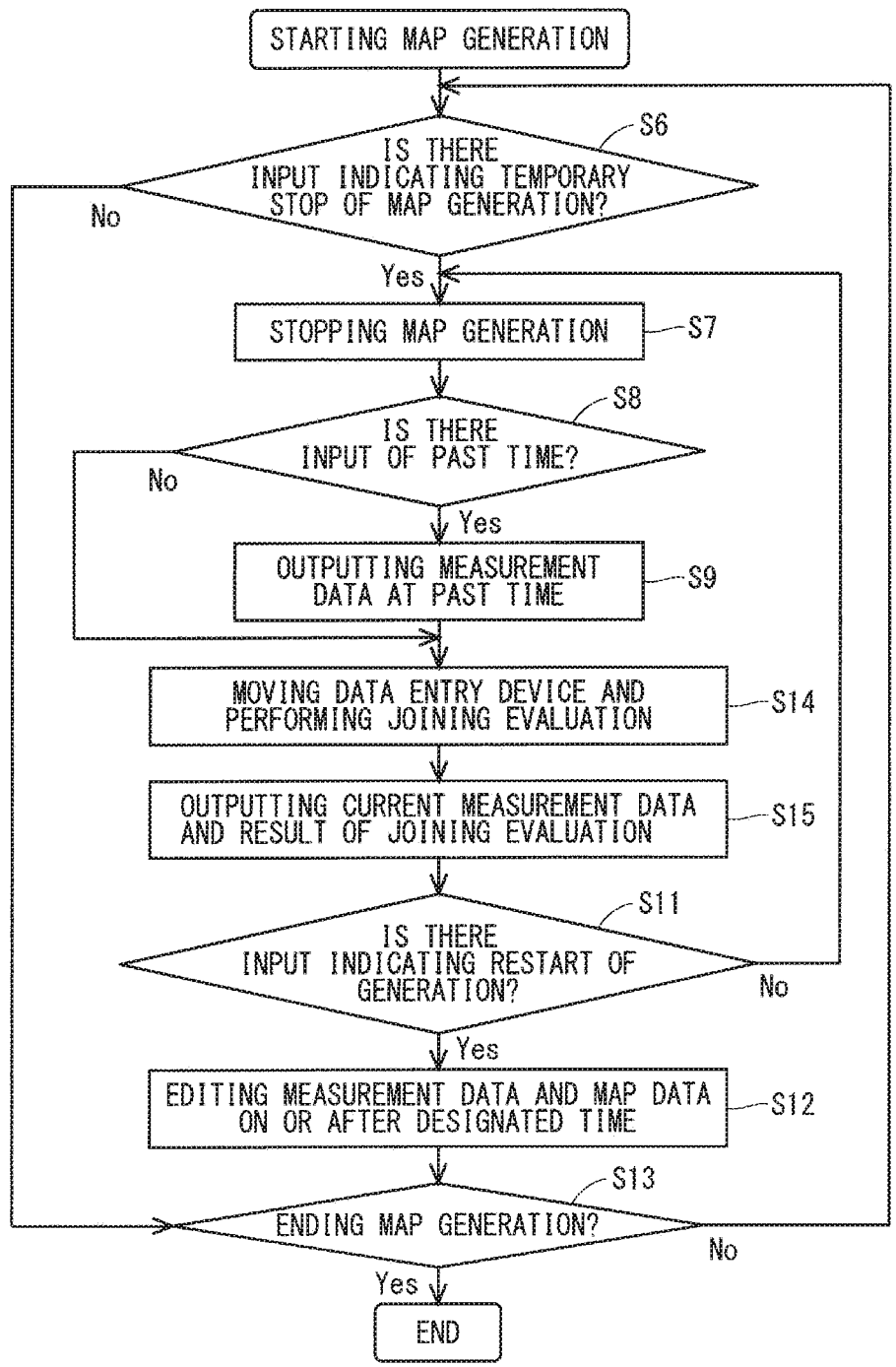
FIG. 22 is a flowchart showing the operation of a map data generator according to a seventh embodiment of the present invention.

FIG. 22 is a diagram illustrating process steps after the input process at the temporary stop of the map data generation. After the stopping of the map data generation (i.e., step S7), the process steps (i.e., step S8 and step S9) of outputting the measurement data and the map data at the designated time in response to an input of the designated time, if any, are the same. In both cases: after the output of the measurement data and the map data (i.e., step S9); and the case where there is no input of the designated time in step S8, the map-data generating unit 11 evaluates whether the measurement data that is currently being measured by the data entry device 2 can be joined to the map data at the designated time (i.e., step S14).

Figure 23:
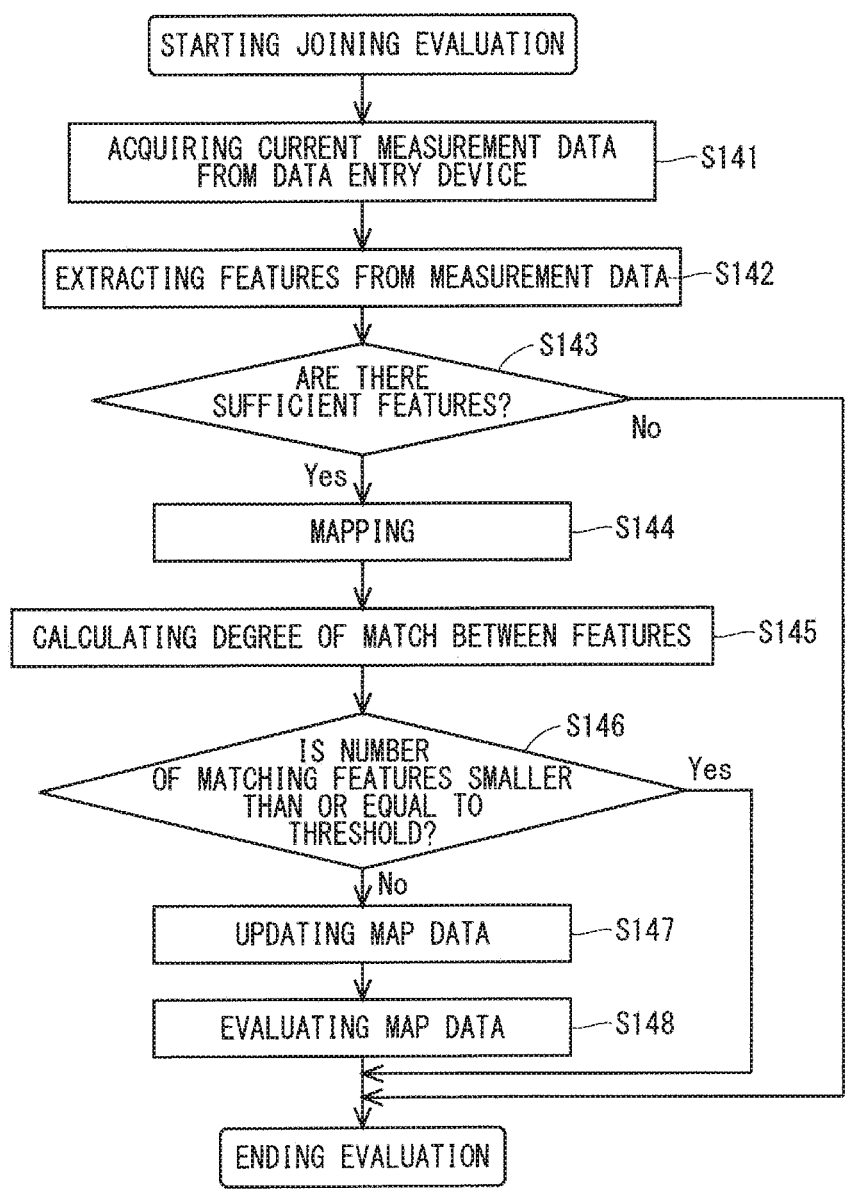
FIG. 23 is a flowchart showing the details of step S14 in FIG. 22.

FIG. 23 is a flowchart showing step S14 in detail. First, the edit unit 14 sends, to the map-data generating unit 11, a signal instructing to evaluate the accuracy of the mapping prediction of the reap data at the designated time of designation as the current data entry device 2. At this time, the edit unit 14 simultaneously sends the map data at the designated time that is held by the edit unit 14. Thereafter, the map-data generating unit 11 executes step S14. The map-data generating unit 11 sends the result of the evaluation to the edit unit 14.

The map-data generating unit 11 acquires the current measurement data from the data entry device (i.e., step S141), and extracts features from the current measurement data (i.e., step S142). The map-data generating unit 11 then makes evaluations on the following three points: the first one is whether mapping is possible; the second one is whether there can be a lost state found; and the third one is whether the accuracy of the mapping prediction is low. The map-data generating unit 11, although making evaluations on these three points in the present embodiment, may make evaluations on only one of them such as whether there can be a lost state found, or may make evaluations on two of them. How to determine a lost state is as described in the fourth embodiment. First, in step S143, the map-data generating unit 11 determines whether mapping is possible. If the features of the current measurement data satisfy a minimal number of features necessary for the mapping, the process proceeds to the next step.

If the features of the current measurement data do not satisfy the minimal number, the map-data generating unit 11 generates an evaluation value indicating that mapping is impossible, and sends the evaluation value to the edit unit 14; step S14 then ends. Next, if there are a minimal number of features, the map-data generating unit 11 performs mapping (i.e., step S144). In this mapping, the map data at the designated time sent from the edit unit 14 is used as three-dimensional data. The detailed process is similar to that in the aforementioned embodiments. After that, the map-data generating unit 11 calculates the number of matching features in the result of the mapping (i.e., step S145), followed by determining whether the number of matching features is smaller than or equal to a threshold to determine whether there is a lost state found (i.e., step S146).

If the number of matching features is greater than or equal to the threshold, thus determining that there is no lost state found, the process proceeds to the next step. If the nu fiber of matching features is less than the threshold, the map-data generating unit 11 generates an evaluation value indicating that there is a lost state found, and sends the evaluation value to the edit unit 14; evaluation step S14 then ends. This is similar to the process described in the fourth embodiment. In the subsequent process steps, the accuracy of the mapping prediction is evaluated based on the current measurement data.

First, using the result of the mapping performed in the previous step, the map-data generating unit 11, on a computer, updates the map data at the designated time (i.e., step S147). The map-data generating unit 11 then evaluates the mapping accuracy with an evaluation method using an error in re-projection of the features, or an evaluation method using at least one of the misdistribution and density of the distribution of the features within the current measurement data as an evaluation value, and the map-data generating unit 11 calculates a mapping evaluation value on the basis of a statistic (i.e., step S148).

This process is similar to that described in the fourth embodiment; the mapping evaluation value may be rated on either two levels indicating "good" and "bad", or multiple levels. The map-data generating unit 11 finally sends the mapping evaluation value, which is the evaluation value, and the current measurement data to the edit unit 14. The edit unit 14 sends the evaluation value and the current measurement data to the rendering unit 15, and sends an instruction to update rendering (i.e., step S15). Based on the current measurement data and the evaluation value, the rendering unit 15 updates rendering. Although the evaluation value is displayed in the present embodiment, the result of the determination of whether mapping is possible, and the presence or absence of a lost state may be displayed.

Figure 24:
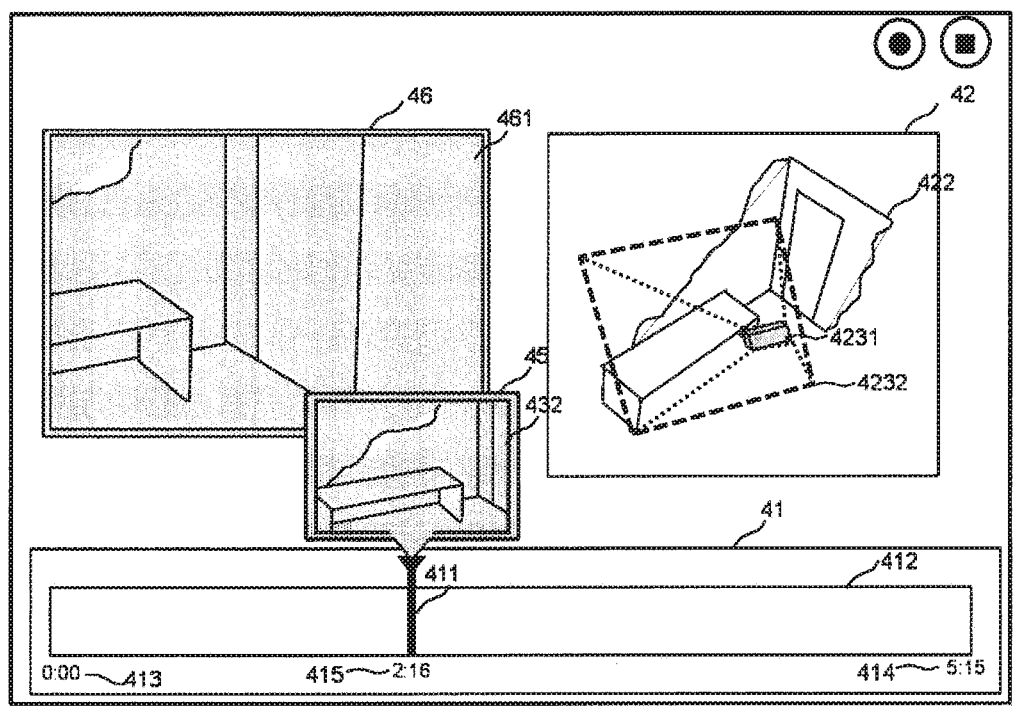
FIG. 24 is a diagram illustrating a display screen at temporary stop of map data generation in the seventh embodiment of the present invention.

FIG. 24 is a diagram illustrating one example of a screen during the temporary stop of the map data generation. As with the corresponding one in the sixth embodiment, the rendering unit 15 renders the acquired current measurement data 461 onto the current-measurement-data rendering region 46. After that, the rendering unit 15 renders information indicating the result of the evaluation value. The rendering unit 15 renders information (e.g., hatching) indicating that joining based on the current measurement data involves low accuracy onto the current-measurement-data rendering region 46 and the measurement-data display region 45.

In the rendering indicating the mapping evaluation value, a display in which the aforementioned three kinds of evaluation value are distinguished (note that for the mapping evaluation value, two levels or multiple levels ay be employed), and a display merely indicating that the mapping prediction involves low accuracy (i.e., there is a problem in joining at the time of the restart), without such distinctions. The foregoing process is repeated until an input indicating the restart of the map data generation (e.g., for every predetermined time or for every frame).

The map data generator allows the user to recognize, before the restart of the generation, whether the map data generation can be properly restarted with the position and posture of the current data entry device 2 at the time of the temporary stop of the map data generation. This saves time and effort for a redo after the restart of the map data generation, thereby improving the efficiency of the map data generation. It is noted that although the evaluations are made on the aforementioned three points, the evaluations are not limited to these three points; an evaluation may be made on one point, or evaluations may be made on two points. It is also noted that how to display the information indicating the evaluation value is not limited to what is shown in FIG. 24.

Although the foregoing has described that the map data generator automatically drops a time period during which the mapping accuracy is unfavorable. The map data generator does not reflect whether joining afterwards is possible. Consequently, in some cases, incorrect map data is generated when the number of matching features between the measurement data and the latest map data is smaller than or equal to a threshold after the dropping (i.e., in the case where there is a lost state found).

In view of this point, the map data generator may be configured to automatically generate map data having high accuracy, without a manual edit of the map data, by automatically dropping a time period during which the mapping accuracy is low, by determining whether joining based on the measurement data afterwards is possible (i.e., whether there is a lost state found), and by repeating the joining process if possible.

In this case, the map-data generating unit 11 automatically drops the time period during which the mapping accuracy degrades, and performs mapping only when the joining is possible; moreover, the rendering unit 15 renders a screen during the map data generation based on this result.

Figure 25:
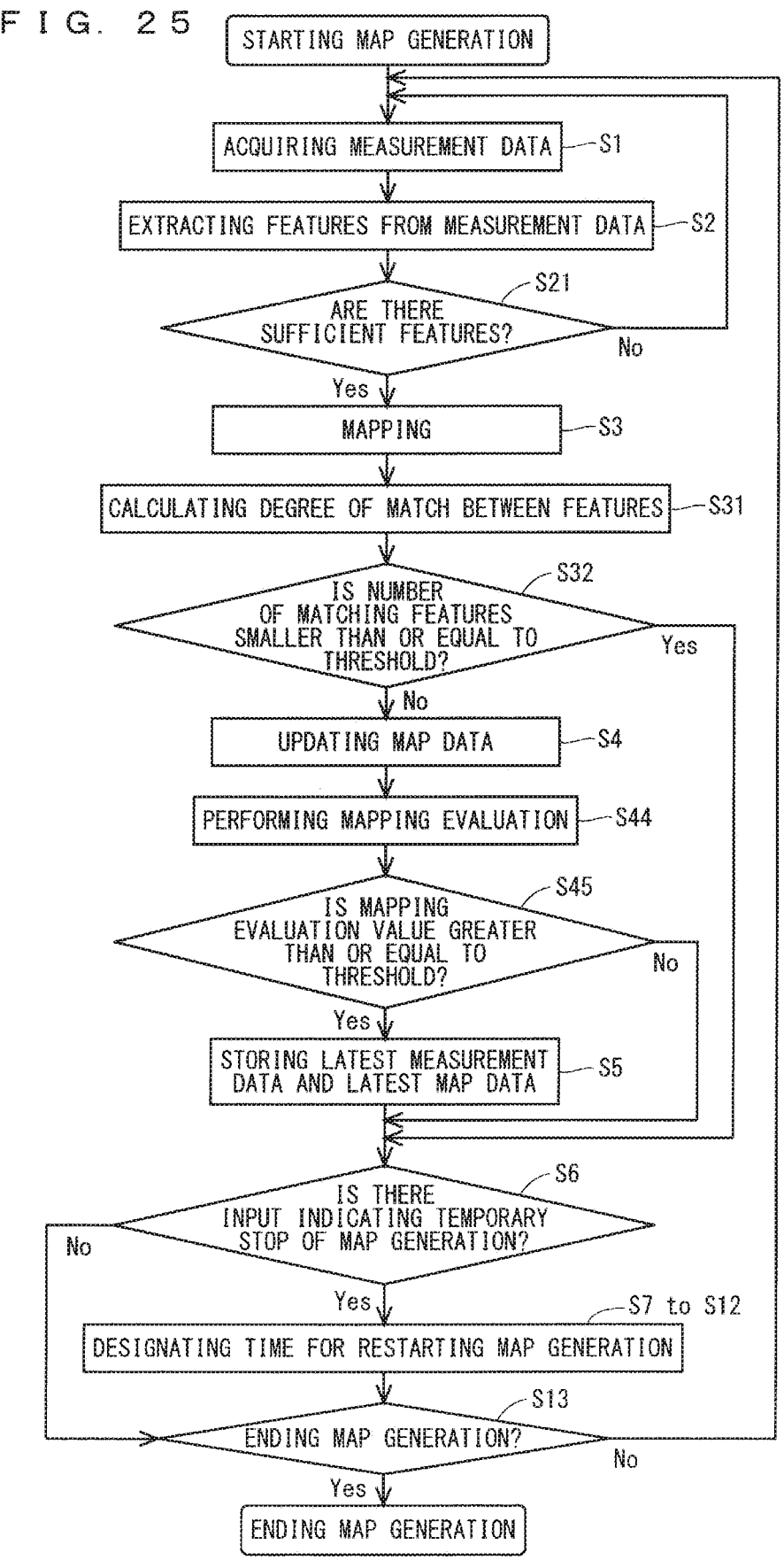
FIG. 25 is a flowchart showing the operation of the map data generator according to the seventh embodiment of the present invention.

FIG. 25 is a flowchart showing the process for automatically dropping the time period during which the mapping accuracy degrades. The following describes the process with reference to this flowchart. The acquiring of the measurement data to the determining of a lost state using the number of matching features, both of which are performed by the map-data generating unit 11, are similar to those described above (i.e., steps S1 to S32). Here, if there is no lost state found, the subsequent process step is to perform automatic dropping when the mapping evaluation value is low, as with the process step in the fifth embodiment.

As a result of the process steps, the map-data generating unit 11 sends, to the edit unit 14, a signal indicating degradation in the mapping evaluation value, and the time data. If there is a lost state found, the map-data generating unit 11 generates a signal indicating the occurrence of the lost state, and the time data, and sends them to the rendering unit 15. That is, the map-data generating unit 11 performs dropping without performing the map data update (i.e., step S4) to the storing of the map data and the measurement data (i.e., step S5), until it acquires the measurement data for avoiding a lost state; when joining becomes possible, the map-data generating unit 11 restarts the map data generation.

Figure 26:
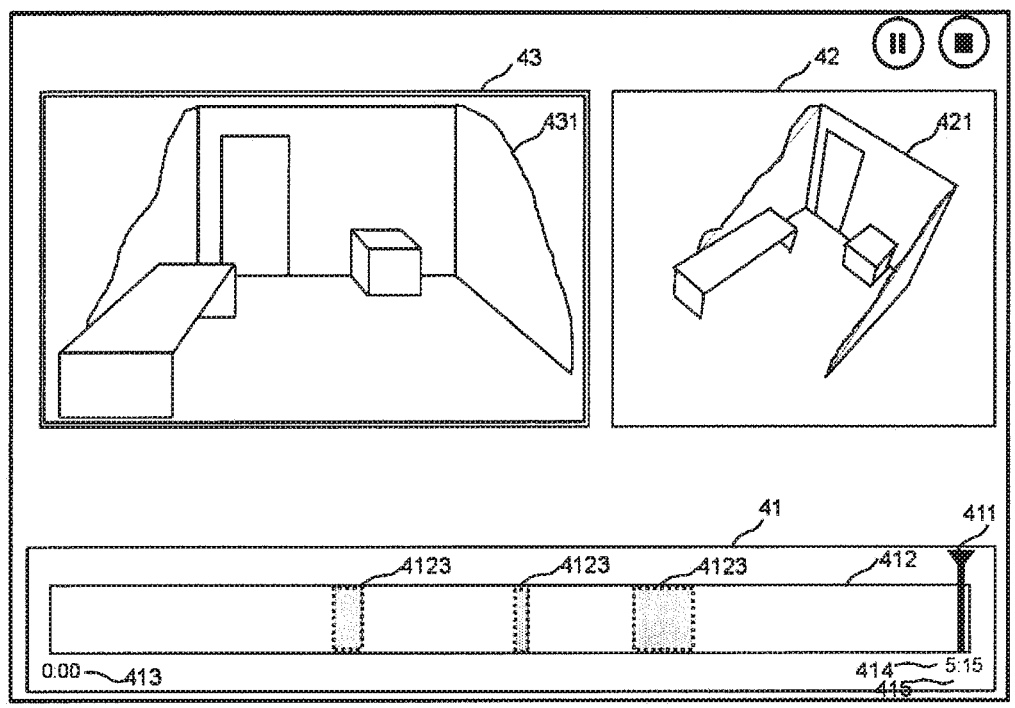
FIG. 26 is a diagram illustrating a display screen during the map data generation in the seventh embodiment of the present invention.

FIG. 26 is a diagram illustrating one example of a screen rendered by the rendering unit 15 during the map data generation. The rendering unit 15 receives, in each frame, a signal indicating time data, an evaluation value, a lost state, and a mapping evaluation value from the map-data generating unit 11, and updates the seek bar 41, the measurement-data rendering region 43, and the map-data rendering region 42. On the seek bar 41, the drop time period 4123 is rendered based on a signal indicating a lost state and a low mapping evaluation value.

The map data generator, which performs mapping using the measurement data pieces that are capable of being joined, only when the mapping accuracy is favorable, allows the user to generate special map data without editing the map data that is determined to have low accuracy by the generator. At this state, the user does not have to strictly consider how to move the data entry device 2 (e.g., moving a measuring device slowly for avoiding the occurrence of a lost state, moving, every time, to where many features are measured), and thus can easily generate the map data by freely moving the data entry device 2. The user consequently bears a less burden relating to the map data generation.

It is noted that the map data generator, which is a map-data measuring device, generates the map data normally; when the user determines that an unnecessary object is seen, the map data generator allows the user to stop the map data generation temporarily, as described above, and to manually drop the map data in this time period. The foregoing has described the differences between the seventh embodiment and the first to sixth embodiments. The other configuration is similar to those in the first to sixth embodiments.

EXPLANATION OF REFERENCE SIGNS

1 map data generator, 2 data entry device, 3 input device, 4 output device, 11 map-data generating unit, 12 map data DB, 13 measurement data DB, 14 edit unit, 15 rendering unit.

The invention claimed is:

1. A map data generator comprising:
   a measurement data database;
   a map data database;
   a processor to execute a program; and
   a memory to store the program which, when executed by the processor, performs processes of,
   acquiring, as a measurement data piece, a plurality of image data pieces in two dimensions and a distance data piece, the plurality of image data pieces being continuously imaged, and each having an imaging range partly overlapping an imaging range of at least one of the other image data piece in the plurality of image data pieces, the distance data piece indicating a distance to an object within each of the plurality of image data pieces;
   relating the acquired measurement data piece with a time data piece to store the acquired measurement data piece and the time data piece in the measurement data database, the time data piece being used for linking the measurement data piece in chronological order to store the measurement data piece in the measurement data database;
   updating a map data piece in three dimensions generated based on a plurality of the measurement data pieces, every time the measurement data piece is acquired;
   relating the map data piece that is sequentially updated with the time data piece corresponding to the measurement data piece used when the map data piece is updated, to store the map data piece and the time data piece in the map data database;
   receiving an input of a designated time, the designated time indicating a time in the past and corresponding to a map data piece to be further updated; and
   checking, as the time data piece, the received designated time against the map data database to identify the map data piece to be further updated and corresponding to the designated time,
   wherein the updating process comprises upon receiving the designated time redoing the update of the identified map data piece using a newly acquired measurement data piece that is newly acquired after the designated time is received.

2. The map data generator according to claim 1, wherein
the checking process comprises upon receiving the designated time, checking, as the time data piece, the designated time against the measurement data database to identify each of the plurality of image data pieces,
the program, when executed by the processor, performs a process of displaying each of the plurality of identified image data pieces or the identified map data piece onto a screen,
the receiving process comprises receiving a request for map data update, which indicates a request to update the map data piece, and
the updating process comprises upon receiving the request for map data update while displaying each of the plurality of image data pieces or the map data piece identified at the designated time, redoing the update of the map data.

3. The map data generator according to claim 2, wherein the displaying process comprises displaying each of the plurality of acquired image data pieces onto the screen every time the measurement data piece is acquired.

4. The map data generator according to claim 2, comprising a target-position data database configured to store a target-position data piece and the time data piece that are obtained when the plurality of image data pieces are imaged, the target-position data piece being a piece of positional information about a data entry device, the data entry device being configured to acquire each of the plurality of image data pieces to send each of the plurality of image data pieces to the map data generator,
wherein the checking process comprises checking, as the time data piece, the designated time against the target-position data database to identify the target-position data piece, and
the displaying process comprises displaying the identified target-position data piece onto the screen.

5. The map data generator according to claim 3, comprising a target-position data database configured to store a target-position data piece and the time data piece that are obtained when the plurality of image data pieces are imaged, the target-position data piece being a piece of positional information about a data entry device, the data entry device being configured to acquire each of the plurality of image data pieces to send each of the plurality of image data pieces to the map data generator,
wherein the checking process comprises checking, as the time data piece, the designated time against the target-position data database to identify the target-position data piece, and
the displaying process comprises displaying the identified target-position data piece onto the screen.

6. The map data generator according to claim 2, wherein the checking process comprises
checking, as the time data piece, a drop start time as designated and a drop end time as designated against the map data database to identify the map data piece that has been updated from the drop start time to the drop end time, and
deleting the identified map data piece.

7. The map data generator according to claim 3, wherein the checking process comprises
checking, as the time data piece, a drop start time as designated and a drop end time as designated against the map data database to identify the map data piece that has been updated from the drop start time to the drop end time, and
deleting the identified map data piece.

8. The map data generator according to claim 4, wherein the checking process comprises
checking, as the time data piece, a drop start time as designated and a drop end time as designated against the map data database to identify the map data piece that has been updated from the drop start time to the drop end time, and
deleting the identified map data piece.

9. The map data generator according to claim 5, wherein the checking process comprises
checking, as the time data piece, a drop start time as designated and a drop end time as designated against the map data database to identify the map data piece that has been updated from the drop start time to the drop end time, and
deleting the identified map data piece.

10. The map data generator according to, wherein the updating process comprises
extracting a plurality of features from each of the acquired measurement data piece and another one of the measurement data pieces that is contiguous to the acquired measurement data piece, and
for the number of matching features being smaller than or equal to a threshold, determining that there is a lost state indicating that the map data piece is not updatable, the number of matching features being the number of features that matches with each other among the plurality of features, and
the displaying process comprises upon the determination of the lost state, displaying the determination of the lost state onto the screen.

11. The map data generator according to claim 3, wherein the updating process comprises
extracting a plurality of features from each of the acquired measurement data piece and another one of the measurement data pieces that is contiguous to the acquired measurement data piece, and
for the number of matching features being smaller than or equal to a threshold, determining that here is a lost state indicating that the map data piece is not updatable, the number of matching features being the number of features that matches with each other among the plurality of features, and
the displaying process comprises upon the determination of the lost state, displaying the determination of the lost state onto the screen.

12. The map data generator according to claim 4, wherein the updating process comprises
extracting a plurality of features from each of the acquired measurement data piece and another one of the measurement data pieces that is contiguous to the acquired measurement data piece, and
for the number of matching features being smaller than or equal to a threshold, determining that there is a lost state indicating that the map data piece is not updatable, the number of matching features being the number of features that matches with each other among the plurality of features, and
the displaying process comprises upon the determination of the lost state, displaying the determination of the lost state onto the screen.

13. The map data generator according to claim 5, wherein the updating process comprises
extracting a plurality of features from each of the acquired measurement data piece and another one of the measurement data pieces that is contiguous to the acquired measurement data piece, and for the number of matching features being smaller than or equal to a threshold, determining that there is a lost state indicating that the map data piece is not updatable, the number of matching features being the number of features that matches with each other among the plurality of features, and the display process comprises upon the determination of the lost state, displaying the determination of the lost state onto the screen.

14. The map data generator according to claim 10, wherein the updating process comprises upon receiving the designated time, making the determination of the lost state indicating whether the map data piece is not updatable based on the newly acquired measurement data piece, before redoing the update of the map data, and the displaying process comprises displaying a result of the determination onto the screen.

15. The map data generator according to claim 11, wherein the updating process comprises upon receiving the designated time, making the determination of the lost state indicating whether the map data piece is not updatable based on the newly acquired measurement data piece, before redoing the update of the map data, and the displaying process comprises displaying a result of the determination onto the screen.

16. The map data generator according to claim 12, wherein the updating process comprises upon receiving the designated time, making the determination of the lost state indicating whether the map data piece is not updatable based on the newly acquired measurement data piece, before redoing the update of the map data, and the displaying process comprises displaying a result of the determination onto the screen.

17. The map data generator according to claim 13, wherein the updating process comprises upon receiving the designated time, making the determination of the lost state indicating whether the map data piece is not updatable based on the newly acquired measurement data piece, before redoing the update of the map data, and the displaying process comprises displaying a result of the determination onto the screen.

18. A method for generating a map data piece, comprising the steps of:

acquiring, as a measurement data piece, a plurality of image data pieces in two dimensions and a distance data piece, the plurality of image data pieces being continuously imaged, and each having an imaging range partly overlapping an imaging range of at least one of other image data in the plurality of image data pieces, the distance data piece indicating a distance to an object within each of the plurality of image data pieces;

relating the acquired measurement data piece with a time data piece to store the acquired measurement data piece and the time data piece in a measurement data database, the time data piece being used for linking the measurement data piece in chronological order to store the measurement data piece in a database;

updating a map data piece in three dimensions generated based on a plurality of the measurement data pieces, every time the measurement data piece is acquired;

relating the map data piece that is sequentially updated with the time data piece corresponding to the measurement data piece used when the map data piece is updated, to store the map data piece and the time data piece in a map data database;

receiving an input of a designated time, the designated time indicating a time in the past and corresponding to a map data piece to be further updated;

checking, as the time data piece, the received designated time against the map data database to identify the map data piece to be further updated and corresponding to the designated time; and upon receiving the designated time, stopping the update of the map data, and redoing the update of the identified map data piece using a newly acquired measurement data piece that is newly acquired after the designated time is received.

* * * * *